United States Patent [19]
Okumura et al.

[11] Patent Number: 5,896,374
[45] Date of Patent: Apr. 20, 1999

[54] VARIABLE RATE TRANSMISSION METHOD, TRANSMITTER AND RECEIVER USING THE SAME

[75] Inventors: Yukihiko Okumura; Fumiyuki Adachi; Koji Ohno, all of Yokohama; Akihiro Higashi, Yokosuka, all of Japan

[73] Assignee: NTT Mobile Communications Network, Inc., Japan

[21] Appl. No.: 08/732,413

[22] PCT Filed: Feb. 23, 1996

[86] PCT No.: PCT/JP96/00419

§ 371 Date: Oct. 22, 1996

§ 102(e) Date: Oct. 22, 1996

[87] PCT Pub. No.: WO96/26582

PCT Pub. Date: Aug. 29, 1996

[30] Foreign Application Priority Data

Feb. 23, 1995 [JP] Japan ................... 7-035702
Jun. 14, 1995 [JP] Japan ................... 7-147728
Dec. 13, 1995 [JP] Japan ................... 7-324823

[51] Int. Cl.$^6$ ............................ H04B 7/216; H04J 13/02
[52] U.S. Cl. .................. 370/311; 370/342; 370/470; 370/510; 340/825.44; 371/67.1; 375/200; 375/368; 455/38.3
[58] Field of Search ................... 370/470, 471, 370/311, 216, 229, 230, 232, 234, 335, 342, 441, 465, 509, 510, 514, 545, 914; 455/38.2, 38.3, 68, 69, 70; 340/825.44; 371/47.1, 48, 67.1; 375/200, 206, 365, 368

[56] References Cited

U.S. PATENT DOCUMENTS 5,509,020  4/1996  Iwakiri et al. ............... 371/5.1
5,511,073  4/1996  Padovani et al. ............ 370/471

FOREIGN PATENT DOCUMENTS

| 62-169550 | 7/1987 | Japan . | |
|---|---|---|---|
| 63-31330 | 2/1988 | Japan . | |
| 3-108927 | 5/1991 | Japan . | |
| 03-250935 | 11/1991 | Japan ............... | H04L 1/00 |
| 03-261255 | 11/1991 | Japan ............... | H04L 29/08 |
| 3-250935 | 11/1991 | Japan . | |
| 3-261255 | 11/1991 | Japan . | |
| 05-048577 | 2/1993 | Japan ............... | H04L 1/00 |
| 5-48577 | 2/1993 | Japan . | |
| 05-327580 | 12/1993 | Japan ............... | H04B 7/26 |
| 5-327580 | 12/1993 | Japan . | |
| 5-344162 | 12/1993 | Japan . | |
| 6-204959 | 7/1994 | Japan . | |
| 6-216963 | 8/1994 | Japan . | |

*Primary Examiner*—Alpus H. Hsu
*Attorney, Agent, or Firm*—Rogers & Wells LLP

[57] ABSTRACT

A variable rate transmission method that can vary the transmission rate of data. A transmitting side supplies a transmitted data sequence to an error detecting encoder 105 and a frame memory 103. The frame memory 103 stores data of a variable length to be transmitted in one frame. The error detecting encoder 105 calculates an error detecting code (such as CRC code) for each frame of the transmitted data. A multiplexer 104 adds the calculated error detecting code ahead of the transmitted data to place it at the initial position of the frame, and sequentially outputs the data sequence frame by frame. A receiving side calculates an error detecting code of the data in each transmitted frame in the same manner as the transmitting side, and compares the calculated error detecting code with the error detecting code at the initial position of the frame. The end bit of the frame data is decided as a position at which the two error detecting codes coincide. This makes it possible to transmit variable length data without informing the receiving side of the data length in each frame. This is equivalent that the transmission rate can be varied freely.

57 Claims, 34 Drawing Sheets

CONFIGURATION OF TRANSMITTER

CONFIGURATION OF TRANSMITTER

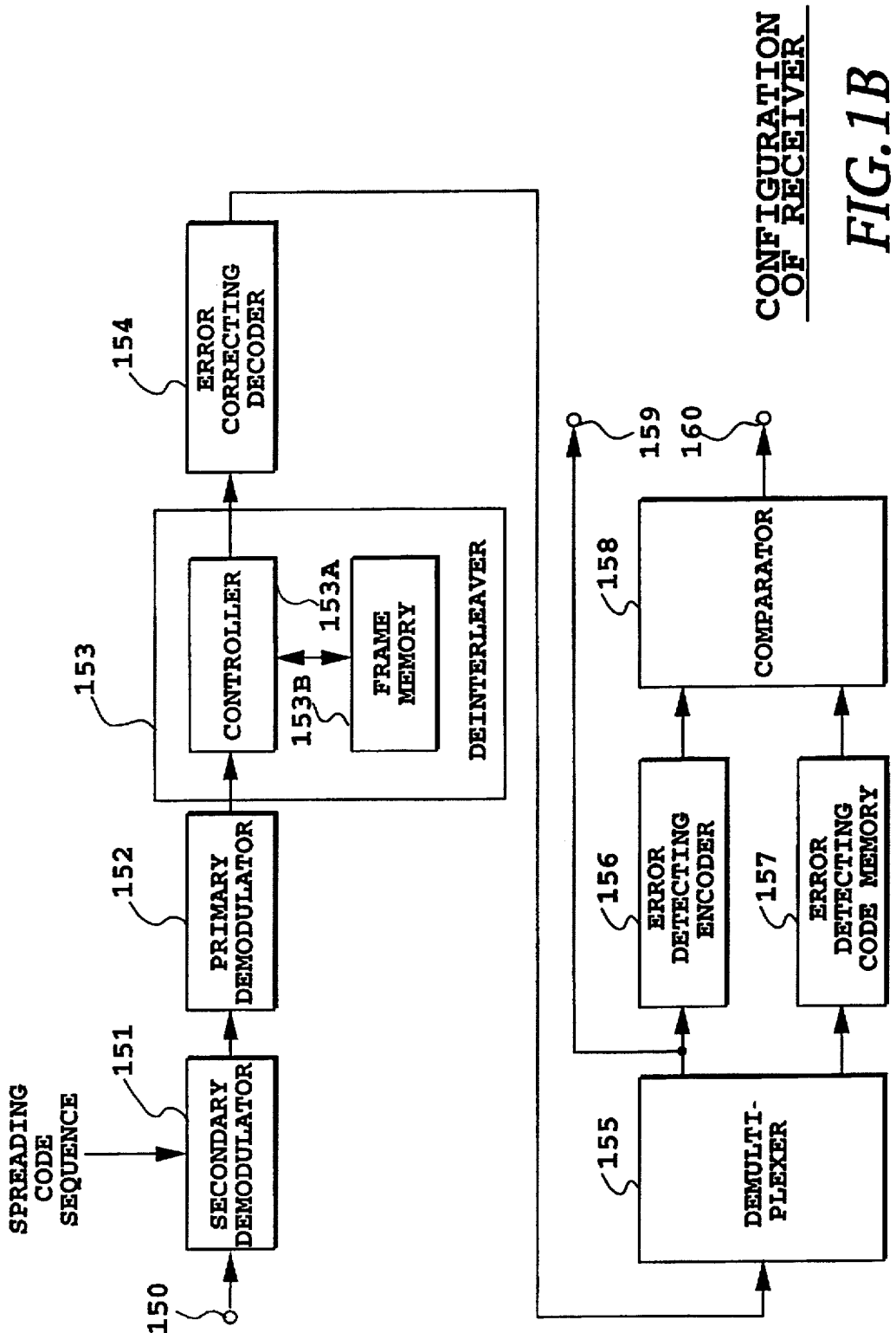

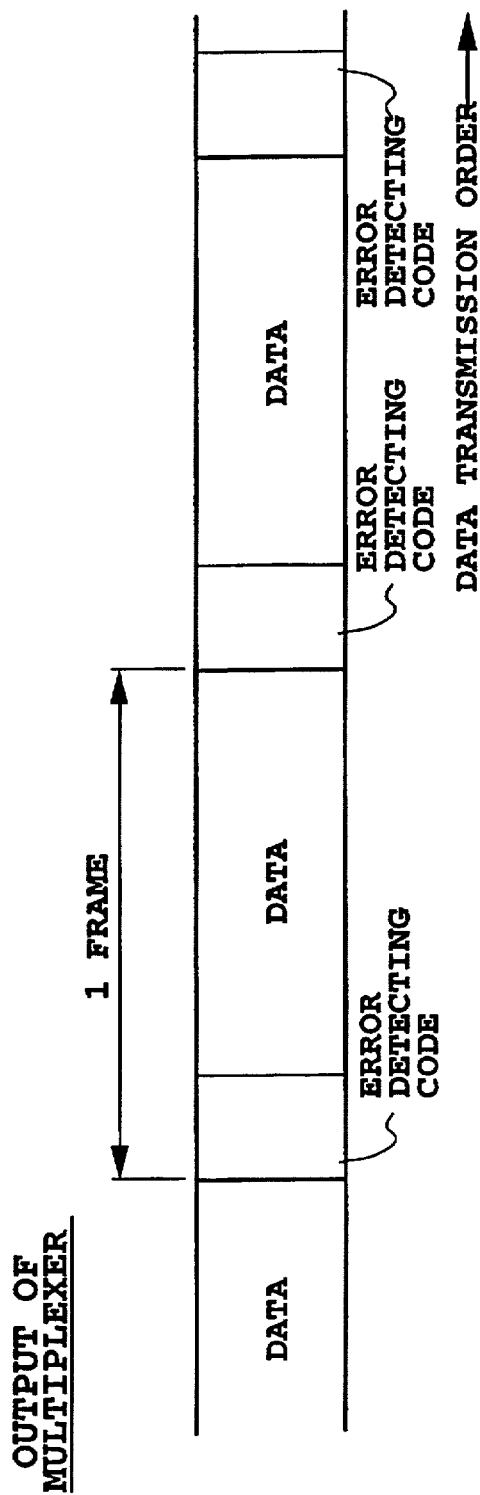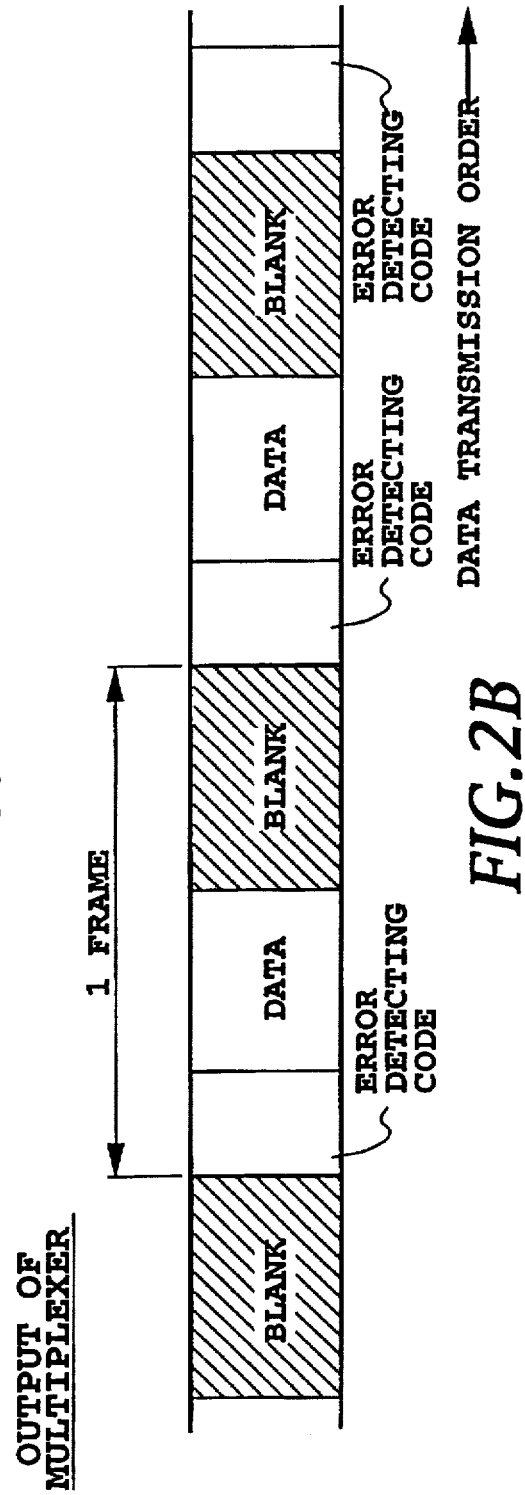

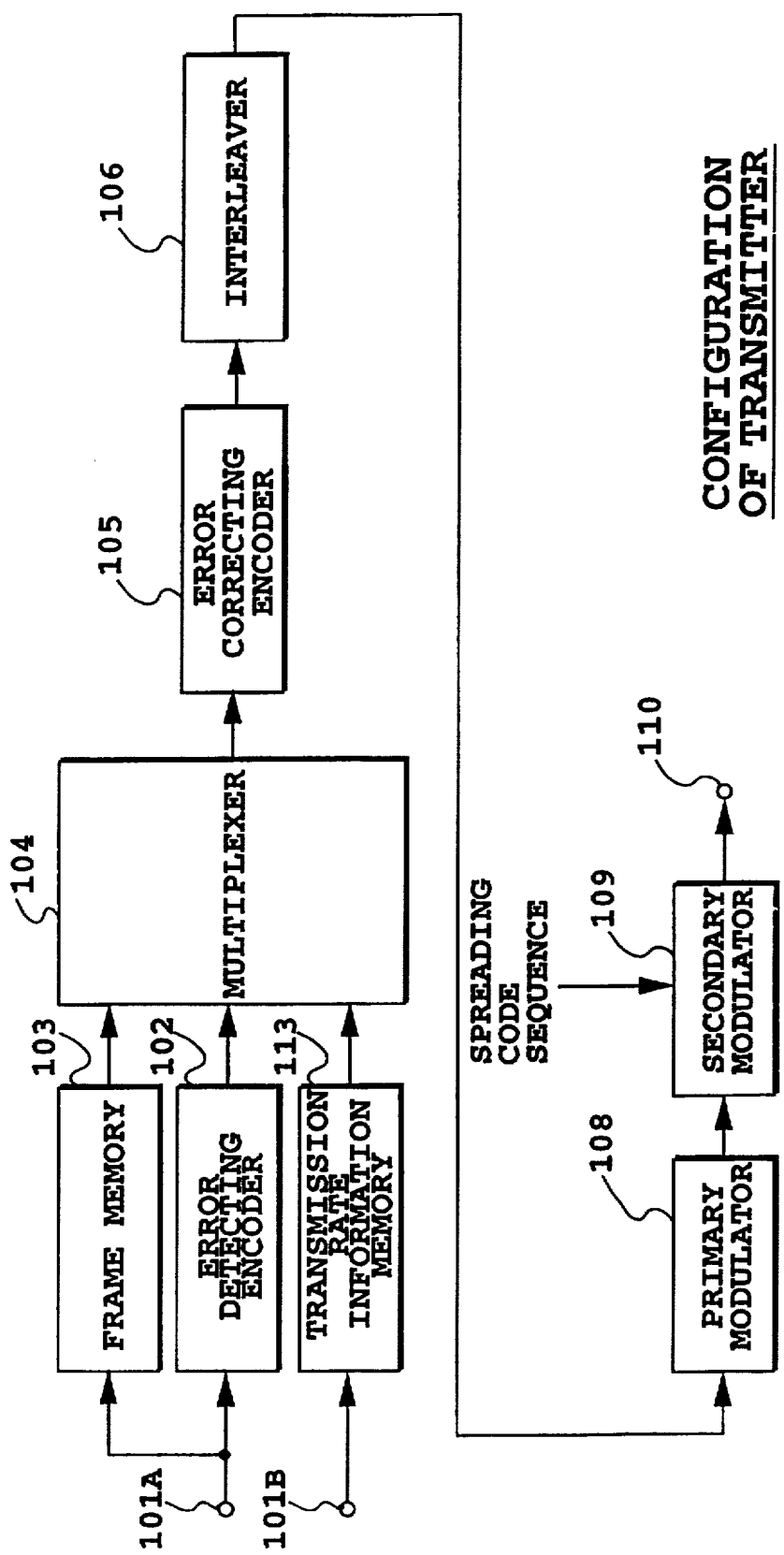
FIG.6A CONFIGURATION OF TRANSMITTER

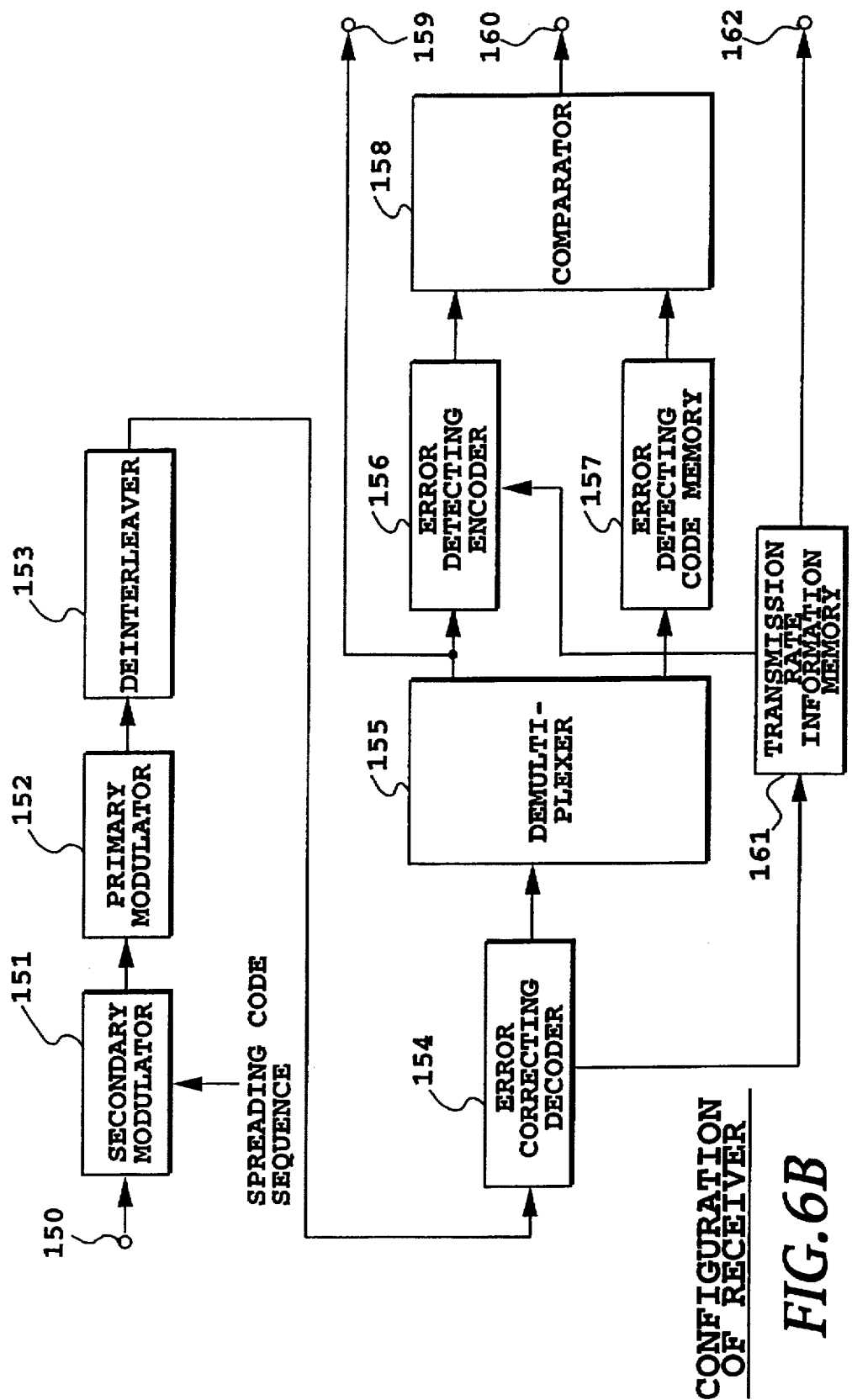

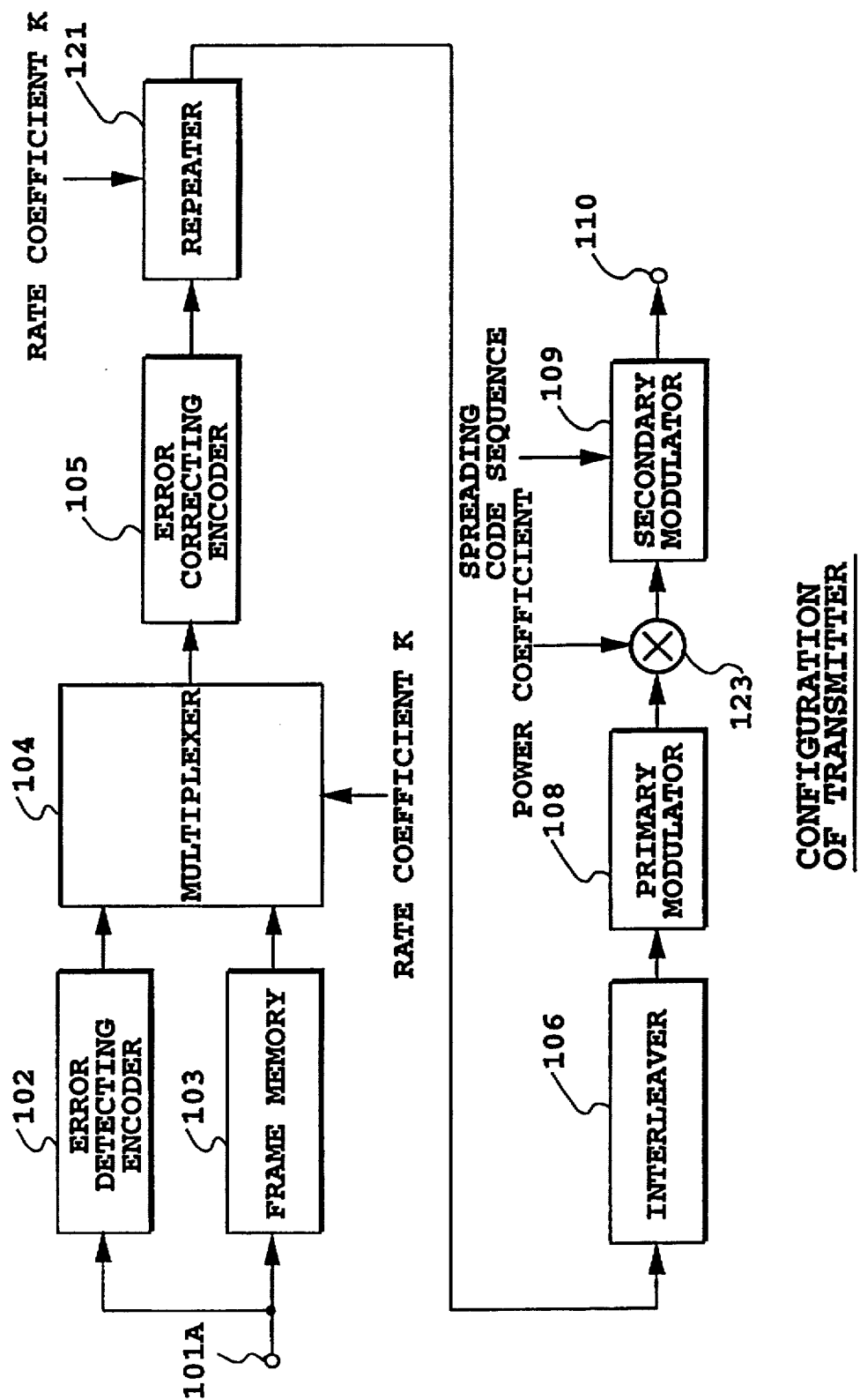

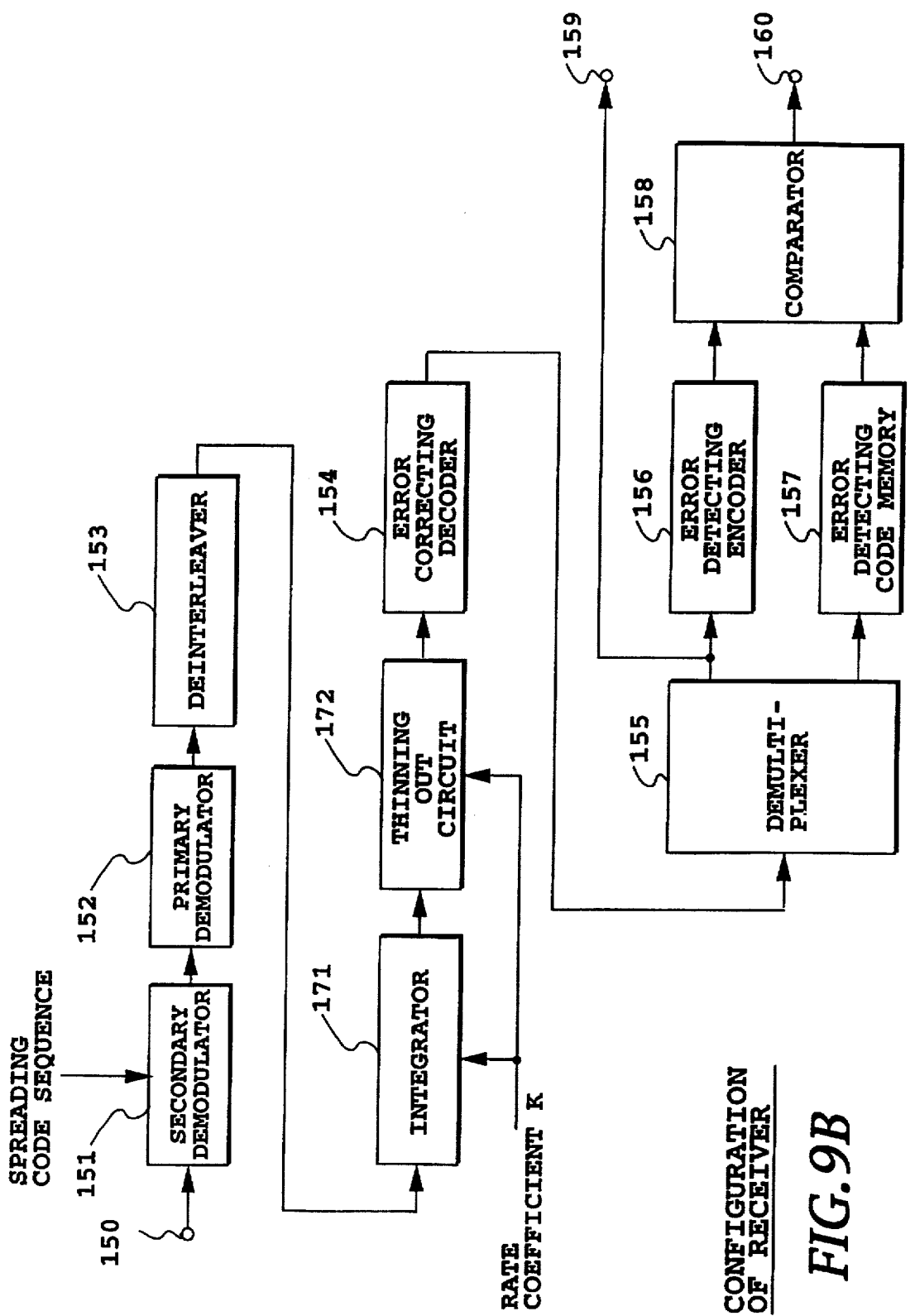
FIG. 9B CONFIGURATION OF RECEIVER

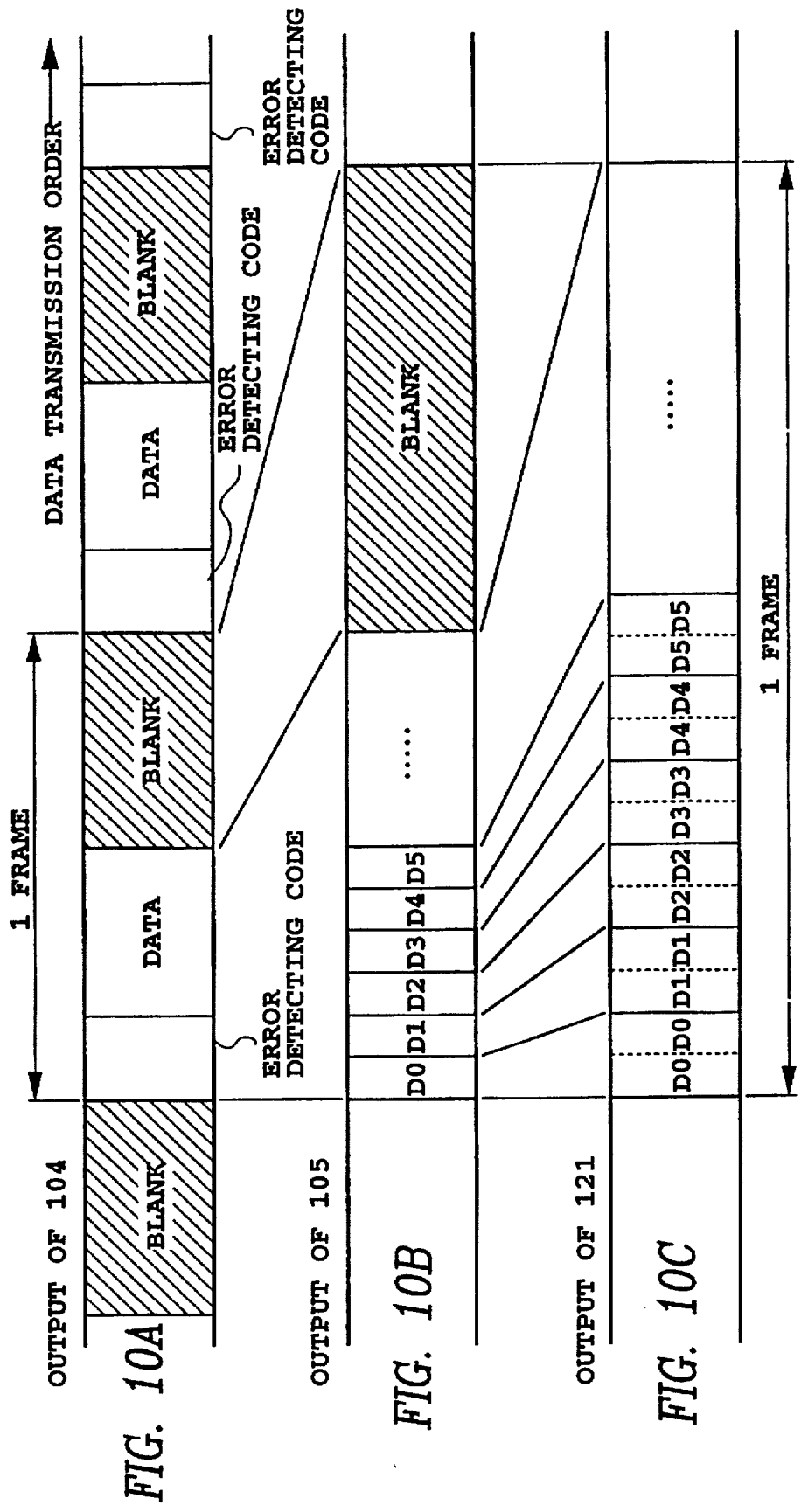

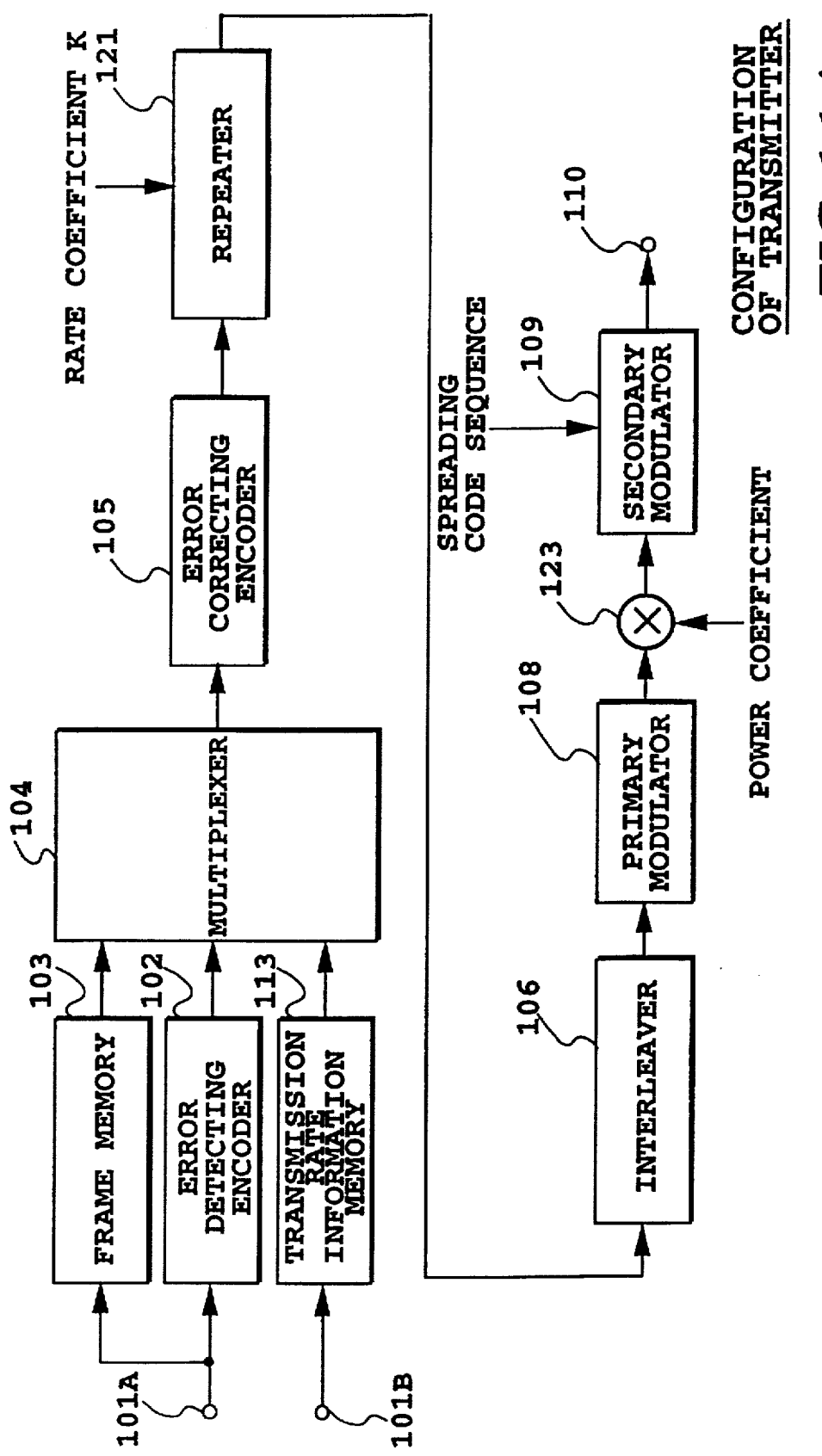
FIG. 11A CONFIGURATION OF TRANSMITTER

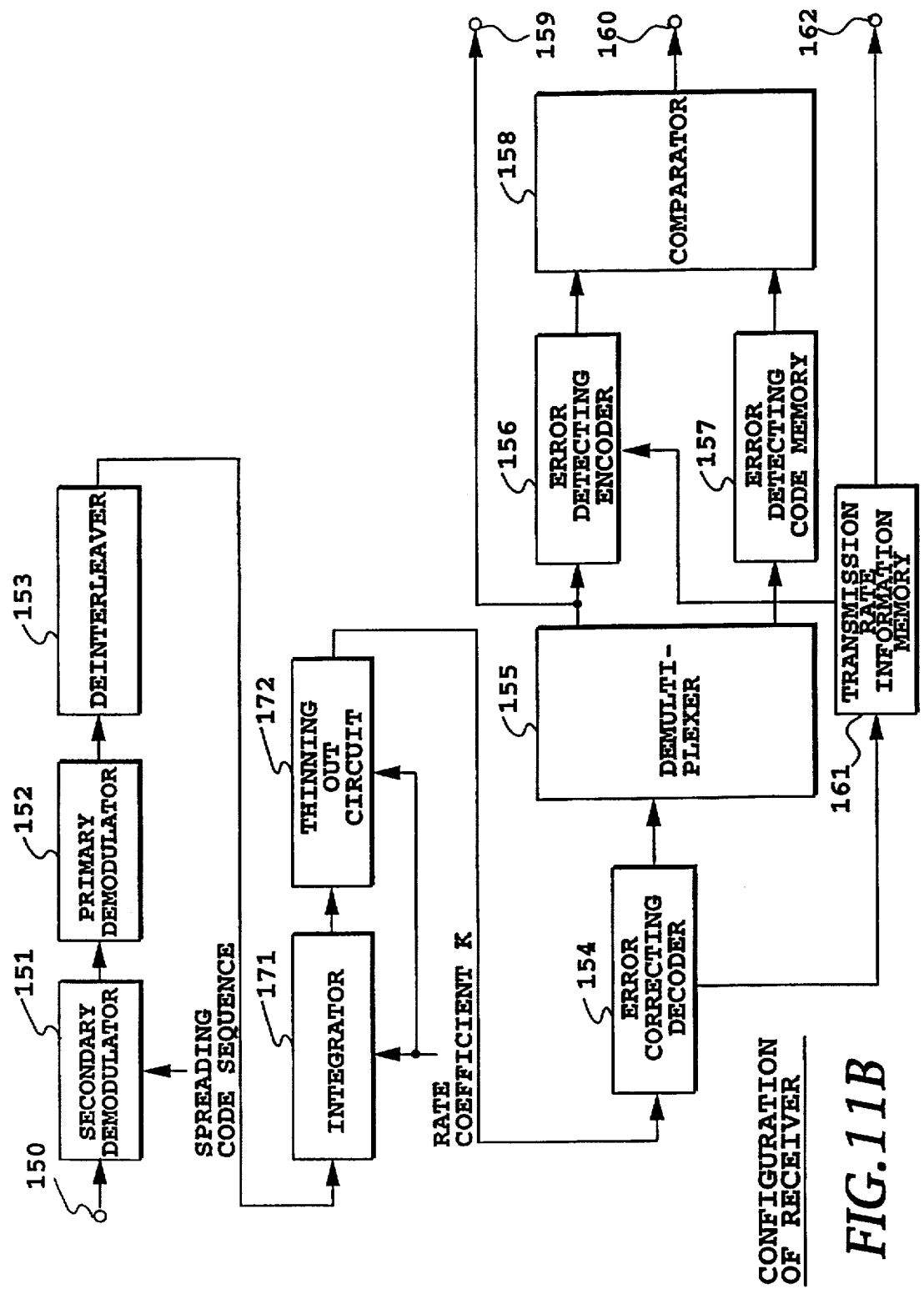

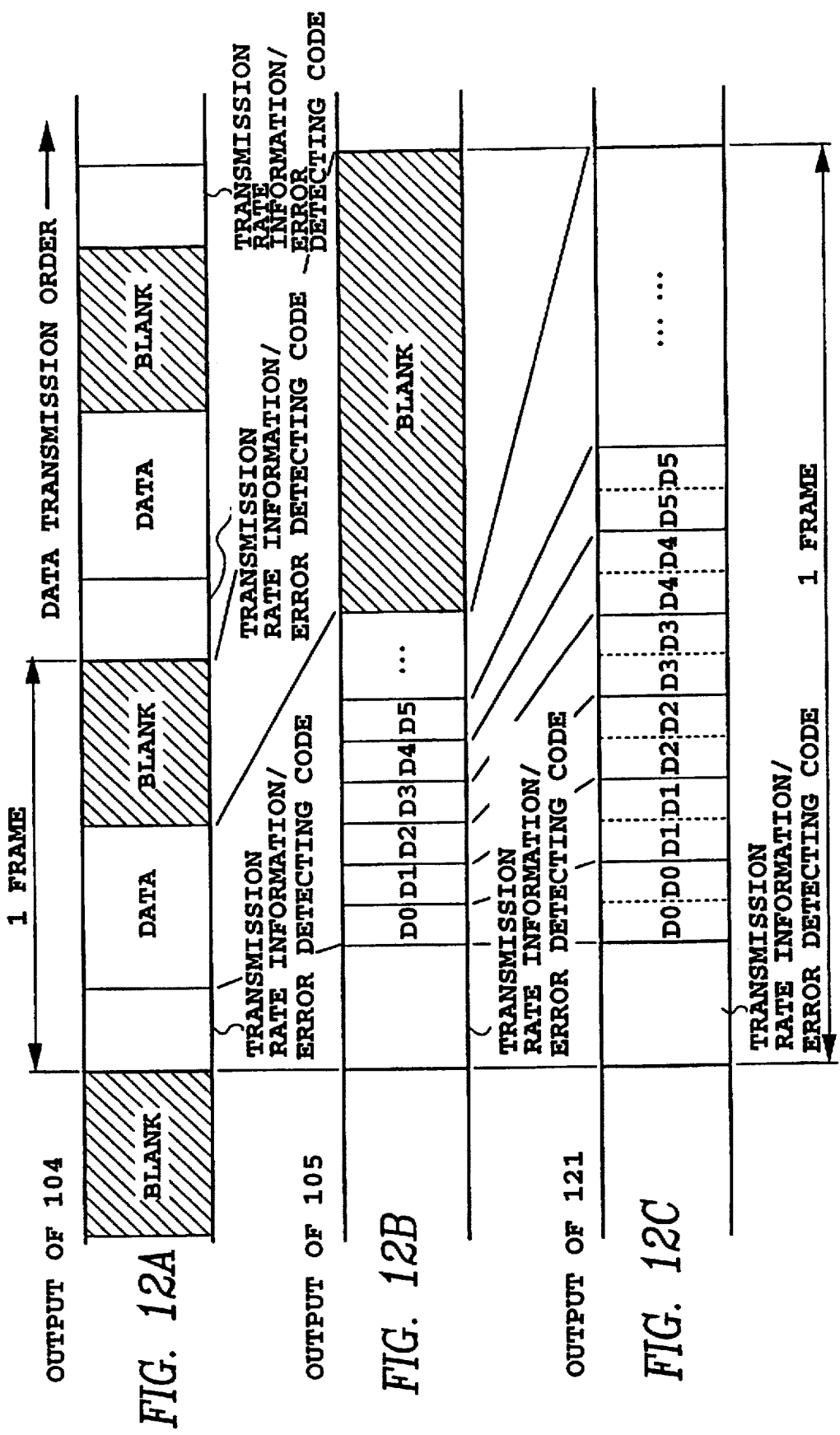

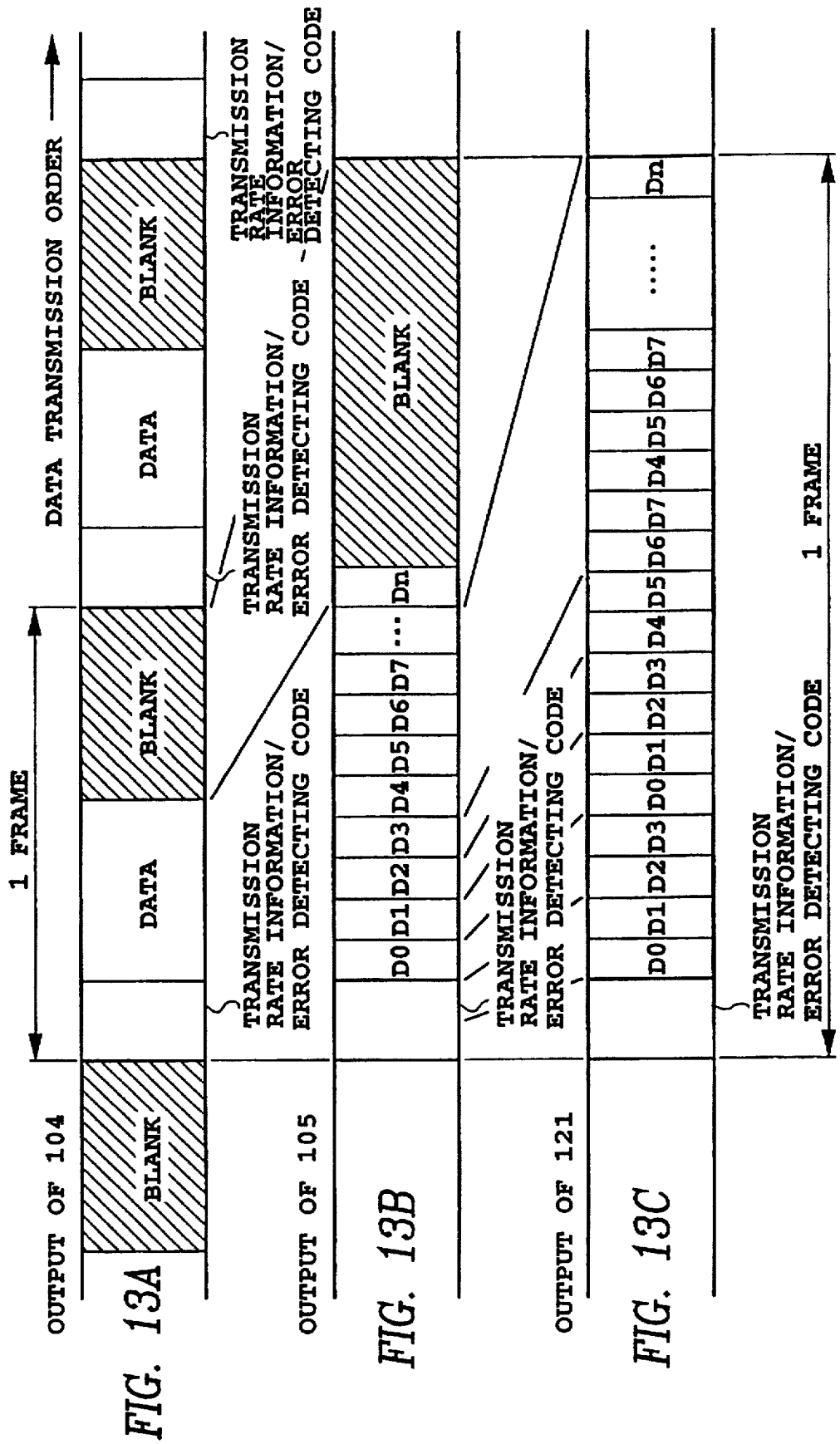

VARIABLE RATE TRANSMISSION METHOD, TRANSMITTER AND RECEIVER USING THE SAME

TECHNICAL FIELD

The present invention relates to a code division multiple access (CDMA) in mobile communications systems, and more particularly to a variable rate transmission method, a transmitter and receiver using the same method, which can realize apparent variable rate transmission by transmitting data contained in frames of a fixed length at a constant transmission rate.

BACKGROUND ART

In CDMA mobile communications, the output data (transmitted data) from a voice codec undergoes primary modulation, followed by secondary modulation using a pseudorandom sequence (spreading code sequence), to be spectrum-spread to a wideband signal and transmitted. The bit rate of the spreading code sequence is called a chip rate, and is tens to hundreds of times faster than the transmission rate. Generally, the primary modulation uses binary or quadrature phase shift keying, and the secondary modulation uses binary phase shift keying.

Considering voice communications, the information amount of a transmitted voice signal is not constant, but varies from time to time. Accordingly, the transmission rate can be changed by dividing the transmitted data into frames of a fixed duration, and by transmitting data of a variable bit length in each frame, thereby achieving effective transmission of information in each frame period. This can obviate useless transmission, thereby saving power consumption of the transmitter.

The following method is taken to transmit data of a different transmission rate in the CDMA system. First, data whose transmission rate is lower than the frame transmission rate is transmitted using a part of transmission frames (see, for example, R. Padovani, "Reverse link performance of IS-95 based cellular systems", IEEE Personal Communications, vol.1, pp.28–34, 3rd Quarter 1994). On the other hand, data whose transmission rate is higher than the frame transmission rate is divided into a plurality of transmission channels, and the divided data are spread using different spreading codes to be transmitted.

It is necessary in this method, however, to provide a receiving side with the transmission rate information. Alternatively, when the transmission rate information is not provided, it is necessary to predetermine the values the transmission rate can take, to carry out the error detection of the received data for all the transmission rates, and to output the received data with the transmission rate at which the error is not detected as the right data.

In this case, if an error occurs during the transmission of the transmission rate information, the effective length in the received frames cannot be decided, which makes it difficult to correctly recover the transmitted data at the receiving side even if no error has occurred during the data transmission.

Thus, it is difficult for the conventional data transmission method to vary the transmission rate during the communications to achieve a variable rate transmission. In addition, when the data is transmitted at a rate considerably lower than a maximum transmission rate, burst transmission occurs because of blanks in the frames, during which data transmission is not carried out. Such burst-like transmission presents a problem in that it causes an EMI (Electromagnetic Interference).

FEC (Forward Error Correction) of the transmitted data is generally used to improve the transmission quality in the case where many errors can occur during transmission as in a mobile communications environment. In this case, the transmitting side transmits transmitted data (including the transmission rate information) which has undergone error correcting encoding, and the receiving side carries out the error correcting decoding followed by extraction of the transmission rate information to decide the effective data length in each received frame. Accordingly, the transmission rate information cannot be obtained until the end of the error correcting decoding. Thus, the decoding is performed before deciding the data length to be decoded, and hence the error correction cannot fully achieve its effect.

On the other hand, there are some data in the transmitted data that can greatly degrade the received data quality when they are corrupted. For example, control data requires transmission quality higher than voice data. Also, the voice data includes some which can greatly degrade the quality and others which cannot, depending on the voice encoding method. In other words, the transmitted data includes data of various degrees of importance.

In view of this, a transmission method is adopted in TDMA (Time Division Multiple Access), which uses error correcting codes of different correcting power in accordance with the degree of importance of the transmitted data (see, for example, "Personal digital cellular telecommunication system RCR standard, RCR STD-27", Research & Development Center for Radio System). This method, however, lacks flexibility to transmit various data of different transmission rates.

As described above, high speed data is divided and spread to a plurality of signals using different spreading codes, and the spread signals are combined to be transmitted. To demodulate such signals at a receiving side using coherent detection, the transmitting side must periodically inserts pilot symbols into transmitted data (see, for example, S. Sampei, "Fading Compensation for 16QAM in Land Mobile Communications", The Transactions of the Institute of Electronics, Information and Communication Engineers of Japan B-II, Vol. J72-B-II pp. 7–15, January 1989, or its revised version, S. Sampei, et al. "Rayleigh Fading Compensation for QAM in Land Mobile Radio Communications", IEEE Transactions on Vehicular Technology, VOL. 42. No. 2, MAY 1993). This method will make it necessary for the plurality of transmission channels to send the same pilot symbols when the method is applied to the signals spread with the plurality of the spreading codes. The respective channels, however, experience the same fading, and hence it is unnecessary to send the pilot symbols through the plurality of channels. Since multiple users share the same frequency band in CDMA, transmission of superfluous signals will reduce the number of users that can be accommodated in a limited frequency band because it will increase interference to other users by an amount corresponding to the transmission power necessary to send the superfluous signals.

Furthermore, the high speed signal must be divided into a plurality of signals followed by spreading using different spreading codes and by combining of the spread signals, and the combined signal is converted into a radio frequency band followed by power amplification to be transmitted. If the plurality of spread signals are combined in the same phase, the amplitude of the combined signal will increase in proportion to the number of divided signals. This will require a high peak power liner transmission power amplifier. Such a power amplifier demanding large power consumption is unsuitable to portable telephones which require low power consumption.

DISCLOSURE OF THE INVENTION

An object of the present invention is to provide a variable rate transmission method, a transmitter and a receiver using the same method, which make it possible to freely change the transmission rate without providing a receiving side with the transmission rate information of transmitted data.

Another object of the present invention is to provide a variable rate transmission method, a transmitter and a receiver, which can achieve data protection in accordance with the degree of importance of the data constituting in the transmitted data.

Still another object of the present invention is to provide a variable rate transmission method, a transmitter and a receiver that can flexibly send data over a wide range from low to high rate.

In a first aspect of the present invention, there is provided a variable rate transmission method which varies an average transmission rate by transmitting each frame of a fixed duration, the frame holding transmitted data of a variable length, wherein a transmitting side comprising the steps of:
 calculating in each frame an error detecting code of the transmitted data;
 transmitting the transmitted data and the error detecting code in the each frame at a predetermined fixed transmission rate; and
 pausing transmission in a blank of each frame, the blank being a part of the frame at which the transmitted data or the error detecting code is absent, and
wherein a receiving side comprises the steps of:
 receiving the each frame at the fixed transmission rate;
 detecting the error detecting code in the each frame; and
 recovering the transmitted data of the variable length in the each frame in response to a detecting result of the error detecting code.

Here, the step of detecting the error detecting code sequentially may divide received data in the each frame by predetermined data while shifting the received data bit by bit, and may decide that the error detecting code is detected at a point at which the received data can be divided.

The step of recovering the transmitted data may decide an end bit position of the transmitted data at a point preceding the point at which the error detecting code is detected by the number of bits of the error detecting code.

The transmitting side may further comprise the steps of:
 periodically inserting pilot symbols of a known pattern into the each frame; and
 disposing important data of the transmitted data near the pilot symbols, and
wherein the receiving side comprises the steps of:
 detecting the pilot symbols;
 compensating the transmitted data and the error detecting code which are received using the pilot symbols which are detected; andrelocating the transmitted data to its original order.

The step of disposing the important data near the pilot symbols may comprise the steps of:
 writing the transmitted data row by row into a memory with N rows and M columns alternately from a top row and a bottom row of the memory, where N and M are positive integers;
 reading from the memory, column by column, the transmitted data which has been stored in the memory;
 inserting the pilot symbols each time the column is read, and wherein the important data is placed in advance at an initial position of the transmitted data.

The method may be CDMA (Code Division Multiple Access), in which the transmitting side comprises the steps of performing primary modulation of the transmitted data and the error detecting code, and performing secondary modulation of a signal which has undergone the primary modulation using a spreading code sequence.

Transmission power of the pilot symbols and the important data may be increased.

The transmitting side may comprise the steps of:
 informing the receiving side that the transmitted data and the error detecting code are repeated K times, where K is a positive integer, when a total amount of the transmitted data and the error detecting code is equal to or less than $1/K$ of a maximum amount of data that can be transmitted by one frame;
 generating frames, in each of which each bit of the transmitted data and the error detecting code is repeated K times; and
 transmitting the frames which have been generated, at transmission power of $1/K$ of transmission power used when the each bit is not repeated,
and wherein the receiving side comprises the step of:
 recovering original data from the transmitted data and the error detecting code by thinning out data using the K informed from the transmitted side.

The transmitting side may comprise the steps of:
 allocating each frame of a plurality of channels with the transmitted data;
 periodically inserting pilot symbols of a known pattern into each frame of one of the plurality of channels;
 disposing important data of the transmitted data near the pilot symbols; and
 spreading the transmitted data simultaneously using different spreading code sequences assigned to the plurality of channels to transmit spread data through the each channel, and
wherein the receiving side comprises the steps of:
 simultaneously receiving the plurality of channels;
 detecting pilot symbols of the one of the plurality of channels;
 compensating received signals of the plurality of channels using pilot symbols detected; and
 relocating the transmitted data received to its original order.

Data of the plurality of channels may be transmitted with a phase of a carrier of each of the plurality of channels being shifted.

The important data may be control data.

The transmitting side may comprise the step of disposing the error detecting code at a fixed position in the each frame, and the receiving side comprises the steps of extracting the error detecting code placed at the fixed position in the each frame, and obtaining the number of bits of the transmitted data on the basis of the error detecting code.

The method may be a CDMA data transmission method in which the transmitting side comprises the steps of performing primary modulation of the transmitted data and the error detecting code in the each frame, and performing secondary modulation of primary modulated data in each frame by using a spreading code sequence, to be transmitted.

The transmitting side may comprise the step of performing error correcting encoding and interleaving of the transmitted data before the primary modulation, and wherein the receiving side comprises the steps of performing a primary demodulation of the transmitted data which is received, and performing deinterleaving and error correcting decoding of the transmitted data which have undergone the primary demodulation.

The transmitting side may comprise the steps of:

repeating each bit of the transmitted data and the error detecting code K times, where K is a positive integer, when a total amount of the transmitted data and the error detecting code in the each frame is equal to or less than 1/k of a maximum amount of data that can be transmitted by the each frame;

reducing transmission power of the each frame to 1/k of transmission power used when the bit is not repeated;

and wherein the receiving side comprises the step of:

integrating over K bit interval the transmitted data and the error detecting code which have been received; and recovering the transmitted data by performing thinning out processing of integrated data for every K bits.

The transmitting side may comprise the step of:

adding to a fixed position in the each frame, transmission rate information representative of the number of bits of data in the each frame and the error detecting code, and wherein the receiving side comprises the steps of:

obtaining an end bit position of the transmitted data in each the frame in response to the transmission rate information;

calculating error detecting code of the transmitted data to the end position;

comparing the calculated error detecting code with the error detecting code which has been received; and deciding that the transmitted data to the end bit position is correct when a compared result of the step of comparing coincides.

Transmission method may be a CDMA data transmission method in which the transmitting side comprises the steps of performing primary modulation of the transmitted data and the error detecting code in the each frame, and performing secondary modulation of primary modulated data in each frame by using a spreading code sequence, to be transmitted.

The transmitting side may comprise the steps of:

performing error correcting encoding of the transmitted data, the transmission rate information and the error detecting code in the each frame before the primary modulation, and interleaving error correcting encoded data in the each frame, followed by supplying interleaved data to the step of performing primary modulation, and wherein the receiving side comprises the steps of:

despreading data in the each frame which is received by using a spreading code sequence;

performing a primary demodulation of a despread signal;

deinterleaving transmission data which has undergone the primary demodulation;

performing error correcting decoding of the transmission rate information and the error detecting code; and performing error correcting decoding of the transmitted data to its end bit in accordance with a result of the error correcting decoding of the preceding step.

The transmitting side may comprise the step of:

placing the transmission rate information associated with a current frame at a fixed position in a preceding frame, and wherein the receiving side comprises the steps of:

extracting the transmission rate information received in the preceding frame; and deciding an end bit position of data in the current frame in response to the transmission rate information which has been extracted.

The transmitting side may comprise the steps of:

performing error correcting encoding of data in the each frame;

interleaving the each frame;

performing primary modulation of the each frame which has been interleaved; and performing secondary modulation of primary modulated transmission data in the each frame by using a spreading code sequence, and wherein the receiving side comprises the steps of:

performing a primary demodulation of the transmission data which has been received;

deinterleaving the transmission data which has undergone the primary demodulation;

performing error correcting decoding of the transmission rate information which has been transmitted in the preceding frame, and of the error detection code in the current frame; and performing error correcting decoding the transmitted data to its end bit in accordance with a result of the error correcting decoding of the preceding step.

The transmission method may comprise, when the number of bits of the transmitted data in the each frame is equal to or less than 1/k of the maximum number of bits of data that can be transmitted by the each frame, where K is a positive integer, at the transmitting side:

repeating each bit of the transmitted data K times, where K is a positive integer; and reducing transmission power of the each frame to 1/k of transmission power used when the bit is not repeated, and at the receiving side:

integrating over a K bit interval the transmitted data which has been received; and recovering the transmitted data by performing thinning out processing of integrated data for every K bits.

In a second aspect of the present invention, there is provided a transmitter which varies an average transmission rate by transmitting each frame of a fixed duration, the frame holding transmitted data of a variable length, the transmitter comprising:

means for calculating in the each frame an error detecting code of the transmitted data; and means for transmitting the transmitted data and the error detecting code in the each frame at a predetermined fixed transmission rate, and for pausing transmission in a blank of each frame, the blank being a part of the frame at which the transmitted data or the error detecting code is absent.

Here, the transmitter may further comprise:

pilot symbol inserting means for periodically inserting pilot symbols of a known pattern into the each frame;

a memory for storing the transmitted data; and data relocating means for disposing near the pilot symbols important data of the transmitted data stored in the memory.

The data relocating means may dispose the important data near the pilot symbols by writing the transmitted data into the memory row by row with a length of M bits, and by reading the stored transmitted data from the memory column by column with a length of N bits, wherein N is the number of bits of a slot sandwiched by the pilot symbols, and M is the number of the slots contained in the each frame.

The data relocating means may write the important data into the memory alternately from a top row and a bottom row of the memory.

The transmitter may further comprise:
   a primary modulator for modulating data in the each frame including the transmitted data, and
   a secondary modulator for performing secondary modulation that spreads data of the each frame which has undergone the primary modulation using a spreading code sequence, and
wherein the pilot symbol inserting means is connected between the primary modulator and the secondary modulator, and periodically inserts the pilot symbols between the slots.

The transmitter may further comprise a transmission power control means connected to the pilot symbol inserting means for controlling transmission power of data in the each frame in accordance with a degree of importance of the data.

A predetermined particular code may be written in a blank in the each frame, the blank occurring when the number of bits of the transmitted data is less than the maximum number of bits of the each frame, and wherein the transmission power control means reduces transmission power of the blank to zero.

The transmitter may further comprise a repeater preceding the memory for repeating the transmitted data and the error detecting code K times for each bit, and wherein the transmission power control means reduces transmission power of the each frame to 1/k as compared with transmission power used when the K time repeating is not performed.

The transmitter may further comprise:
   pilot symbol inserting means for periodically inserting pilot symbols of a known pattern into the each frame;
   a memory for storing the transmitted data, the memory capable of reading multiple sets of transmitted data associated with a plurality of channels;
   data relocating means for writing data into the memory such that important data of the transmitted data stored in the memory is placed near the pilot symbols;
   a plurality of primary modulators for primary modulating the multiple sets of transmitted data read from the memory;
   a plurality of transmission power control means for controlling transmission power of the each frame output from the primary modulators;
   a plurality of secondary modulators for spreading data in the each frame output from the transmission power control means by using different spreading code sequences; and
   an adder for adding multiple signals output from the secondary modulators, and
wherein the data relocating means divides the transmitted data to be written into the memory, simultaneously reads from the memory the multiple sets of transmitted data which have been formed by the dividing, and supplies read data to the plurality of primary modulators, and the pilot symbol inserting means is connected after one of the plurality of primary modulators for periodically inserting the pilot symbols, and the plurality of transmission power control means increase transmission power while transmitting the important data.

The transmitter may further comprise a plurality of phase controllers each connected after the plurality of primary modulators for shifting phases of carriers of the secondary modulators.

The transmitter may further comprise means for adding the error detecting code to a fixed position in the each frame.

The transmitter may further comprise:
   means for performing error correcting encoding of data in the each frame;
   means for interleaving data which has undergone the error correcting encoding;
   means for primary modulating interleaved data; and
   means for secondary modulating primary modulated data by using a spreading code.

The transmitter may further comprise:
   means for repeating K times each bit of data in the each frame when the number of bits of the data in the each frame is equal to or less than 1/k of the maximum number of bits that can be transmitted in one frame, where K is a positive integer; and
   transmission power control means for reducing transmission power of the each frame to 1/k in comparison with transmission power used when the K time repeating is not performed.

The transmitter may further comprise adding means for adding, to a fixed position of the each frame, transmission rate information representative of the total number of data in the each frame, and the error detecting code.

The transmitter may further comprise:
   means for performing error correcting encoding of the transmitted data, the transmission rate information, and the error detecting code in the each frame;
   means for interleaving data which has undergone the error correcting encoding;
   means for primary modulating interleaved data; and
   means for secondary modulating primary modulated data by using a spreading code.

The transmitter may further comprise means for adding the transmission rate information associated with a current frame to a fixed position in a preceding frame.

The transmitter may further comprise:
   means for repeating K times each bit of data in the each frame when the number of bits of the data in the each frame is equal to or less than 1/k of the maximum number of bits that can be transmitted in one frame, where K is a positive integer; and
   transmission power control means for reducing transmission power of the each frame to 1/k in comparison with transmission power used when the K time repeating is not performed.

In a third aspect of the present invention, there is provided a receiver comprising:
   means for receiving, at a fixed transmission rate, frames each including transmitted data and an error correcting code;
   means for detecting error detecting code in the each frame; and
   means for recovering the transmitted data of a variable length in the each frame in response to a detection result of the error detecting code.

Here, the means for detecting the error detecting code sequentially may divide received data in each the frame by predetermined data while shifting the received data bit by bit, and may decide that the error detecting code is detected at a point at which the received data can be divided.

The receiver may further comprise:
   means for detecting pilot symbols of a known pattern, which are inserted into the each frame periodically to be transmitted;

a memory for storing data in the each frame; and data relocating means for rearranging data written in the memory to an original order when receiving the data in the each frame, in which important data of the transmitted data is disposed near the pilot symbols.

The data relocating means may rearrange the data in the each frame into the original order by writing the data in the each frame into the memory column by column with a length of N bits, and by reading the stored data of the each frame from the memory row by row with a length of M bits, wherein N is the number of bits of a slot sandwiched by the pilot symbols, and M is the number of the slots contained in the each frame.

The data relocating means may carry out reading of the memory alternately from a top row and a bottom row of the memory.

The receiver may further comprise:

a secondary demodulator for despreading received data by using a spreading code sequence;

a compensator for compensating the data in the each frame by using the pilot symbols; and a primary demodulator for demodulating the data which has been compensated by the compensator.

The receiver may further comprise:

means for integrating over K bit interval the data in the each frame which has been received; and means for recovering the transmitted data by performing thinning out of the integrated data at every K bits.

The receiver may further comprise:

a plurality of secondary demodulators for despreading each of multiple series of frames simultaneously transmitted through a plurality of channels;

a compensator for compensating data in the multiple series of frames by using pilot symbols which are periodically inserted into one of multiple series of frames, and are sent through one of the plurality of channels;

a plurality of primary demodulators for demodulating compensated data;

a memory for storing the multiple series of data at the same time; and data relocating means for rearranging important data disposed near the pilot symbols to its original order by simultaneously writing the multiple series of frames in separated areas of the memory, and by reading written data in an order different from that of writing.

The receiver may further comprise phase controllers each provided for each one of the channels for correcting phases of the multiple series of data.

The receiver may further comprise:

a secondary demodulator for despreading a received spread signal, and for outputting a despread signal;

a primary demodulator for recovering data in the each frame from the despread signal;

an error detecting code memory for storing the error detecting code placed at a fixed position in the each frame;

means for calculating an error detecting code from the data in the each frame; and comparing means for comparing the calculated error detecting code with the error detecting code stored in the error detecting code memory, wherein data is received of a variable bits in the each frame by obtaining the number of bits of the data in the each frame in response to a result of the comparison.

The receiver may further comprise:

means for deinterleaving data output from the primary demodulator; and means for performing error correcting decoding of the data which has been deinterleaved.

The receiver may further comprise:

means for obtaining an end bit position of the transmitted data in each the frame which has been received, in response to the transmission rate information which is placed at a fixed position of the each frame to represent the number of bits of the transmitted data in the each frame;

means for calculating error detecting code of the transmitted data to the end position;

means for comparing the calculated error detecting code with the error detecting code which has been transmitted in the each frame; and means for deciding that the transmitted data to the end bit position is correct transmitted data in the each frame when a compared result coincides.

The receiver may further comprise:

a secondary demodulator for despreading a received spread signal, and outputs a despread signal;

a primary demodulator for recovering data in the each frame from the despread signal;

means for deinterleaving data output from the primary demodulator;

means for performing error correcting decoding of the transmission rate information and the error detecting code among data output from the means for deinterleaving; and means for performing error correcting decoding of the transmitted data to its end bit position in response to a result of the error correcting decoding.

The means for deciding may determine the end bit position of the transmitted data in a current frame in accordance with the transmission rate information received in a preceding frame.

The receiver may further comprise:

a secondary demodulator for despreading a received spread signal, and outputs a despread signal;

a primary demodulator for recovering data in the each frame from the despread signal;

means for deinterleaving data output from the primary demodulator;

means for performing error correcting decoding of the transmission rate information and the error detecting code among data output from the means for deinterleaving; and means for performing error correcting decoding of the transmitted data to its end bit position in response to a result of the error correcting decoding of the transmission rate information received in a preceding frame.

The receiver may further comprise, when the number of bits of data in the each frame is equal to or less than $1/\kappa$ of a maximum number of bits that can be transmitted by one frame, where K is a positive integer:

means for integrating over a K bit interval the data in the each frame which has been received; and means for recovering the transmitted data by performing thinning out of the integrated data at every K bits.

In a fourth aspect of the present invention, there is provided a variable rate transmission method comprising the steps of:

inserting pilot symbols of a known pattern into each frame periodically, and disposing important data of transmitted data near the pilot symbols, at a transmitting side, and detecting the pilot symbols, compensating by the detected pilot symbols the transmitted data and error detecting code which have been received, and rearranging the transmitted data which has been received to its original order.

Here, the step of disposing the important data near the pilot symbols may comprise the steps of:

writing the transmitted data row by row into a memory with N rows and M columns alternately from a top row and a bottom row of the memory;

reading from the memory, column by column, the transmitted data which has been stored in the memory;

inserting the pilot symbols each time the column is read, and wherein the important data is placed in advance at an initial position of the transmitted data.

The method may be a CDMA data transmission method in which the transmitting side comprises the steps of performing primary modulation of the transmitted data and the error detecting code in the each frame, and performing secondary modulation of primary modulated data in each frame by using a spreading code sequence.

The transmission power of the pilot symbols and the important data may be increased.

According to the present invention, since the transmission rate is estimated at the receiving side in response to the error detecting information, it is unnecessary to send the transmission rate information from the transmitting side to the receiving side. This makes it possible to transmit data whose transmission rate changes frame by frame during communications.

Alternatively, providing the receiving side with the transmission rate information can achieve higher reliability variable rate transmission.

Furthermore, mapping the important data close to the pilot symbols in the present invention can achieve the data protection in accordance with the degree of importance of the data. This is because the data error rate is small in the neighborhood of the pilot symbols as will be described later.

Moreover, increasing the transmission power with the degree of importance will reduce the errors of the important data in the CDMA transmission in accordance with the present invention. In addition, varying the transmission power can increase the number of users accommodated in a fixed bandwidth.

Repeating the transmission of respective bits of the transmitted data can prevent burst transmission in the present invention even when the number of bits in a frame is much smaller than the maximum bit number of the frame, that is, even when the transmission rate of the transmitted data is much lower than the maximum transmission rate of the frame.

Finally, according to one aspect of the present invention, the data can be transmitted at a high rate, and the interference power to other users can be reduced. This is because the CDMA system in accordance with the present invention can transmit the pilot symbols and control data through one of a plurality of channels, the other of which transmit high speed data. In addition, since the transmission signals of respective channels can combined after their phases are shifted, the peak of the transmission power can be limited, which in turn will reduce the interference power to other users.

BRIEF DESCRIPTION OF THE DRAWINGS

FIGS. 1A and 1B are block diagrams showing a first embodiment of a transmitter and a receiver using the variable rate transmission method in accordance with the present invention;

FIGS. 2A and 2B are diagrams showing data sequences output from a multiplexer 4 of the first embodiment, wherein FIG. 2A illustrates the data when the transmission rate is maximum, and FIG. 2B illustrates the data when the transmission rate is less than the maximum;

FIGS. 6A and 6B are block diagrams showing a second embodiment of a transmitter and a receiver using the variable rate transmission method in accordance with the present invention;

FIGS. 7A and 7B are diagrams showing the output from the multiplexer 4 of FIG. 6A, wherein FIG. 7A illustrates the data when the transmission rate is maximum, and FIG. 7B illustrates the data when the transmission rate is less than the maximum;

FIGS. 9A and 9B are block diagrams showing a third embodiment of a transmitter and a receiver using the variable rate transmission method in accordance with the present invention;

FIG. 10 is a schematic diagram illustrating the operation of a repeater 121 of FIG. 9A, wherein FIG. 10(A) illustrates the output of the multiplexer 104 of FIG. 9A, FIG. 10(B) illustrates the output of an error correcting encoder of FIG. 9A, and FIG. 10(C) illustrates the output of the repeater 121;

FIGS. 11A and 11B are block diagrams showing a fourth embodiment of a transmitter and a receiver using the variable rate transmission method in accordance with the present invention;

FIG. 12 is a schematic diagram illustrating the operation of the repeater 121 of FIG. 11A, wherein FIG. 12(A) illustrates the output of the multiplexer 104 of FIG. 11A, FIG. 12(B) illustrates the output of the error correcting encoder of FIG. 11A, and FIG. 12(C) illustrates the output of the repeater 121;

FIG. 13 is a schematic diagram illustrating a bit repetition method of frame data in a fifth embodiment of a transmitter using the variable rate transmission method in accordance with the present invention;

BEST MODE FOR CARRYING OUT THE INVENTION

The invention will now be described with reference to the accompanying drawings.

EMBODIMENT 1

Figure 1A:
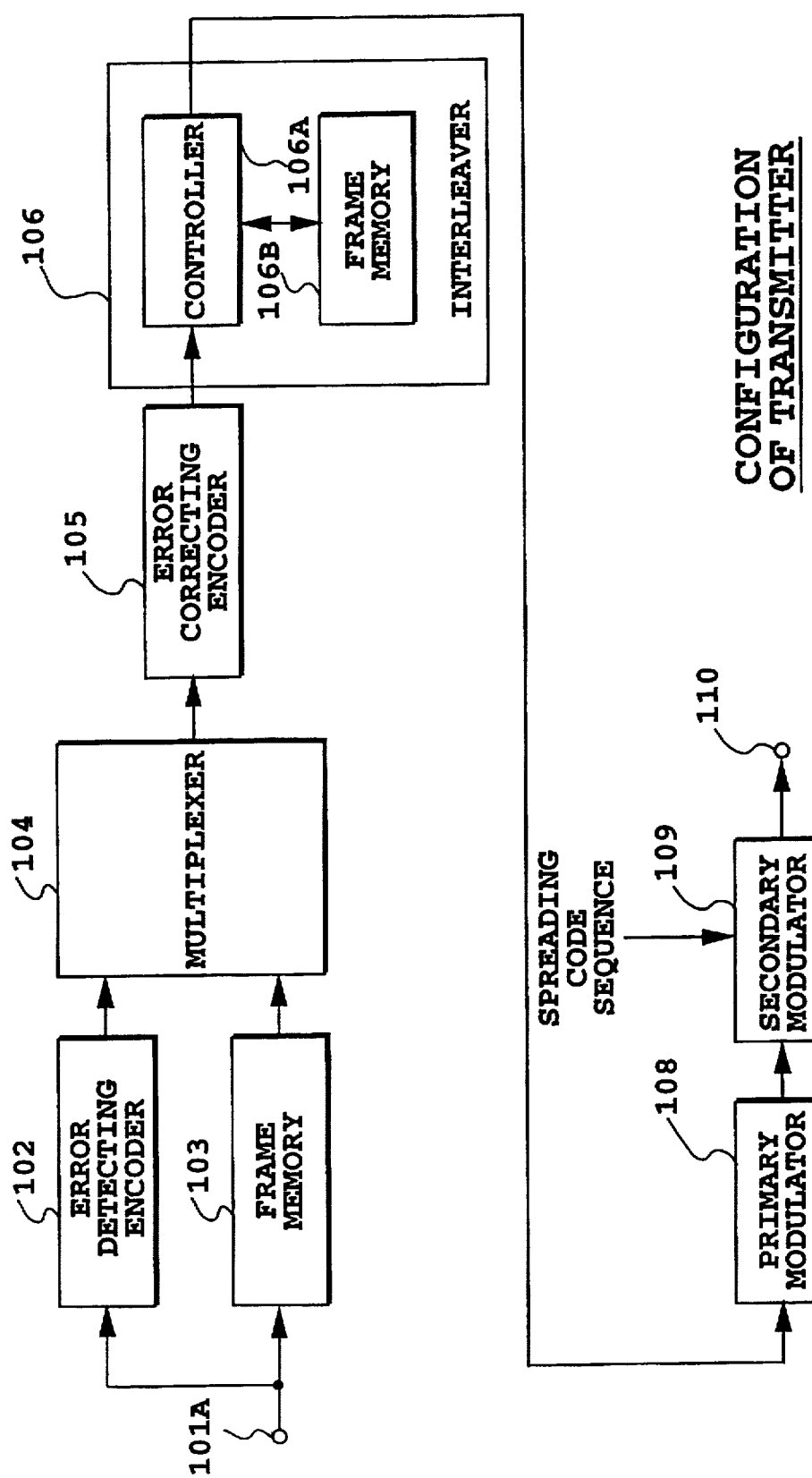

FIGS. 1A and 1B are block diagrams showing a first embodiment of a transmitter and a receiver using the variable rate transmission method in accordance with the present invention.

FIG. 1A shows the configuration of the transmitter. In FIG. 1A, a transmitted data sequence applied to an input terminal 101A is delivered to an error detecting encoder 102 and a frame memory 103. The frame memory 103 holds the data with the number of bits to be transmitted in one frame period. On the other hand, the error detecting encoder 102 calculates the error detecting code (CRC bits, for example) of the transmitted data of one frame. A multiplexer 104 outputs for each frame a data sequence consisting of the calculated error detecting code followed by the transmitted data.

FIGS. 2A and 2B illustrate the data sequences output from the multiplexer 104. FIG. 2A illustrates the data sequence when the transmission rate of the data is maximum, and FIG. 2B illustrates the data sequence when the transmission rate is less than the maximum. As shown in FIG. 2B, an idle time (a blank) takes place in each frame when the transmission rate is less than the maximum rate. The error detecting code is inserted at a fixed position in each frame. For example, in FIGS. 2A and 2B, it is placed at the initial position of the frame.

Returning to FIG. 1A, the data sequence of one frame, into which the error detecting code is inserted, undergoes error correcting encoding through an error correcting encoder 105, and is input to an interleaver 106. The interleaver 106 includes a controller 106A and a frame memory 106B.

Figure 3:
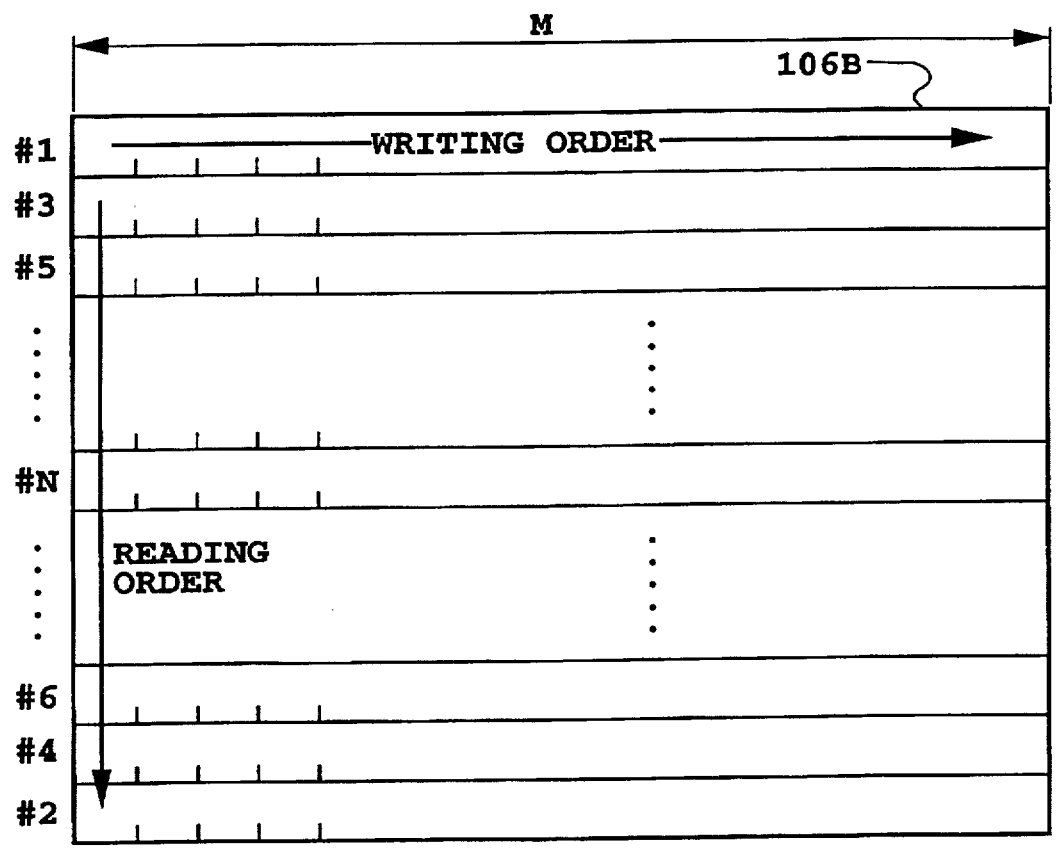
FIG. 3 is a schematic diagram showing a frame memory 106B of an interleaver 106 of FIG. 1A.

FIG. 3 is a schematic diagram illustrating the frame memory 106B of the interleaver 106. Although the frame memory 106B has two sides, that is side-A and side-B, FIG. 3 shows only one of them. Referring to this figure, an example of interleaving will be described. The interleaver 106 reads the data sequence of one frame in a direction different from that of writing to the frame memory 106B. That is, the interleaver 106 reads in the direction of columns the transmitted data which has been written in the direction of rows of the frame memory 106B. The data sequence thus interleaved is rewritten in the other side of the frame memory 106B. Incidentally, numbers #1–#N attached to the left of the frame memory 106B indicate the order of writing the data, which will be described later in the sixth embodiment.

Figure 4:
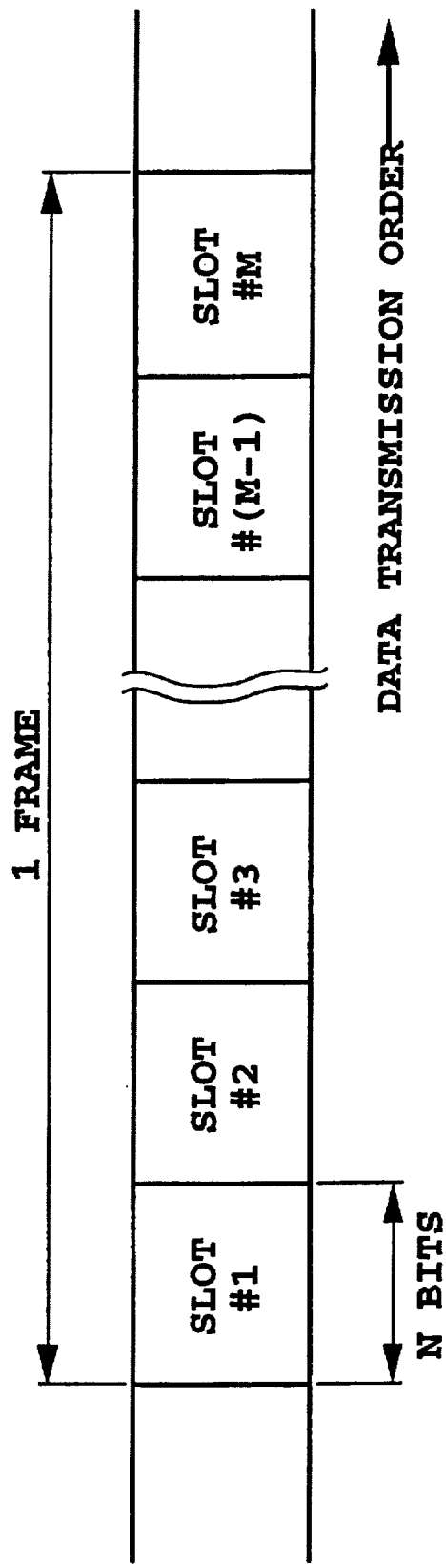
FIG. 4 is a diagram showing the structure of a frame in the data sequence output from the frame memory 106B of FIG. 1A.

FIG. 4 illustrates the frame structure of the data sequence output from the frame memory 106B. The data segments corresponding to individual rows of the frame memory 106B are called slots. Accordingly, if one side of the frame memory 106B corresponding to one frame consists of M bits/row * N rows as shown in FIG. 3, one slot consists of N bits and one frame consists of M slots, and the number of bits of one frame is N*M bits. Thus, the transmitted data undergoes error correcting encoding by the error correcting encoder 105, followed by the interleaving by the interleaver 106. As a result, the probability increases that the transmitted data can be corrected using the error correcting code for burst mode errors.

The frame memories 103 and 106B in FIG. 1A each have two sides (side-A and side-B) to hold two frame data, respectively. The first frame data is written in the side-A of the frame memory 103, and then written in the side-A of the frame memory 106B after the error correcting encoding and the interleaving. The second frame data is written in the side-B of the frame memory 103, and then written in the side-B of the frame memory 106B after the error correcting encoding and the interleaving. Using the side-A and side-B alternately makes it possible to continue the processing of a series of data sequences.

Figure 5:
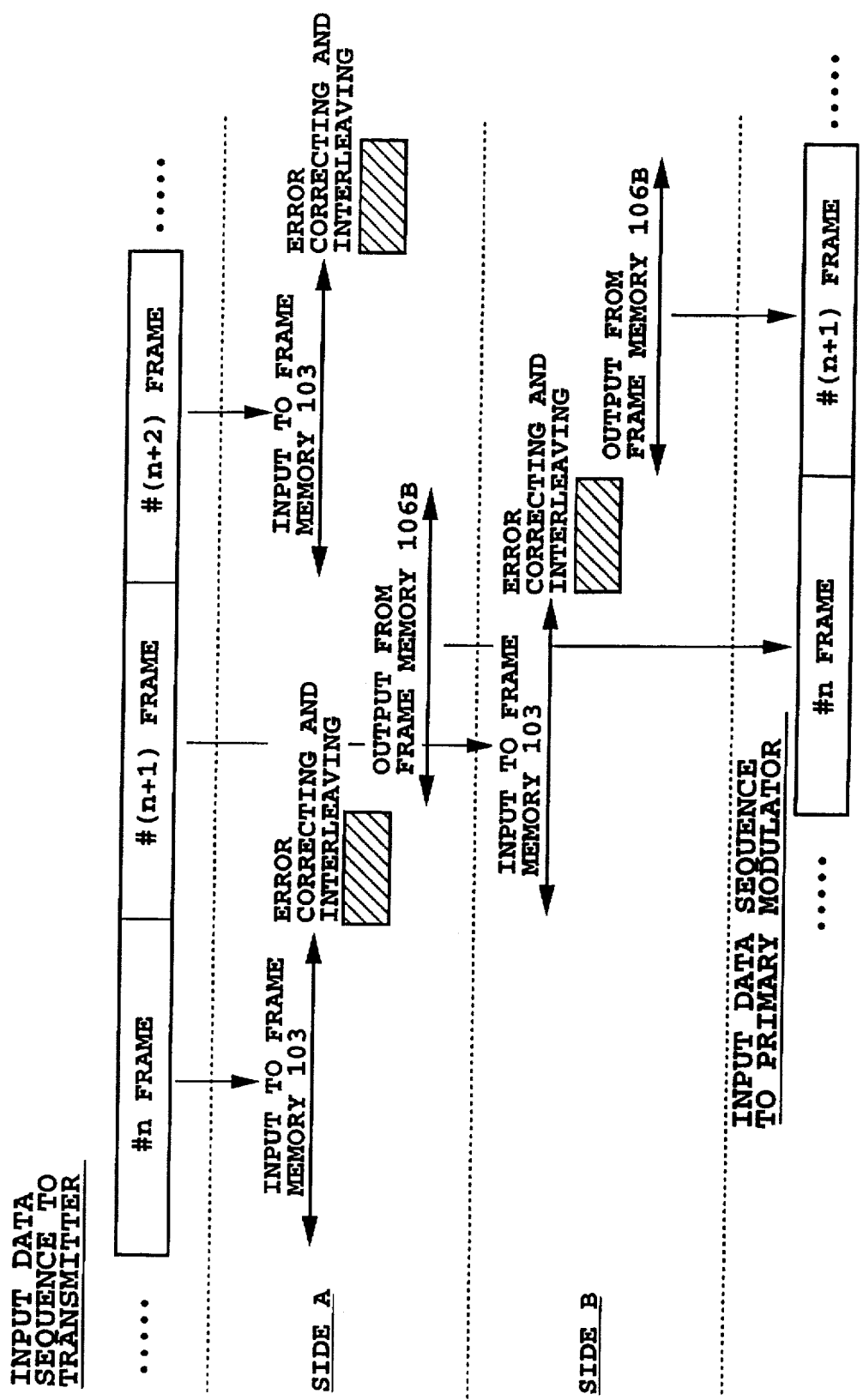
FIG. 5 is a diagram illustrating processing behavior when frame memories 103 and 106B, each of which includes two sides, are used in the first embodiment.

FIG. 5 illustrates the processing using the two-side frame memories. As shown in FIG. 5, the input data sequence of one frame is written in the frame memory 103, undergoes the combined processing of the error correcting encoding and the interleaving, and then the processed data is written into the frame memory 106B. As a result, the transmitted data sequence is delayed by an amount of one frame interval plus the processing time. The data sequence output from the frame memory 106B is phase modulated by a primary modulator 108, followed by phase modulation (spreading) through a secondary modulator 109. The secondary modulator 109 uses a spreading code sequence with a chip rate of integer multiple (usually from tens to hundreds of times) of the transmission rate of the transmitted data, thereby outputting the transmitted data from an output terminal 110. The primary modulator 108 does not carry out the modulation of the blank in each slot.

The transmitter, carrying out the abovementioned processing, transmits the variable number of bits in a fixed frame period. In other words, the spread data is sent at an apparent variable transmission rate.

FIG. 1B is a block diagram showing the receiver. The receiver despreads the spread data fed from an input terminal 150 with a secondary demodulator 151. The despread data is detected by a primary demodulator 152, and is fed to a deinterleaver 153. The deinterleaver 153 includes a controller 153A and a frame memory 153B with two side arrangement, and operates in the reverse order of the input and output in the interleaver 106 at the transmitter. Specifically, the controller 153A writes the data into the frame memory 153B column by column (slot by slot), and reads the data row by row. This procedure enables the original data sequence of one frame to be recovered, thereby producing the error detecting code and the data sequence following it.

The error detecting code and the data sequence undergo error correcting decoding through an error correcting decoder 154, and are fed to a demultiplexer 155. The demultiplexer 155 separates the error detecting code and the transmitted data sequence which are placed at fixed positions in the frame. This is carried out by synchronizing frames in the demultiplexer 155. The demultiplexed error detecting code is fed to an error detecting code memory 157 to be held therein. On the other hand, the data sequence is output from an output terminal 159 as received data, and is input to an error detecting encoder 156, as well. The error detecting encoder 156 performs the same error detecting encoding as that of the transmitter on the input data sequence, again. The error detecting code thus obtained is compared by a comparator 158 with the data sequence held in the error detecting code memory 157 bit by bit of the code. The comparator 158 produces a coincident signal from a terminal 160 when the entire bits agrees with each other. If no error has occurred during the transmission, the coincident signal will be output at the right number of bits of the transmitted data, in which case the received data sequence in the received frame is decided correct, and is output from the output terminal 159.

The data transmission using the transmitter and receiver as described above makes it unnecessary to send from the transmitter to the receiver the information representing the number of bits of the frame. Accordingly, even if the number of bits in the frame (that is, the apparent transmission rate) is varied from frame to frame at the transmitting side, the receiving side can catch up with this correctly. In other words, the variable rate transmission can be achieved in which the apparent transmission rate can be varied frame by frame during the communications. Since the frame length is fixed, the receiver can always identify the frames correctly, even if frames without transmitted data are mixed.

If an error occurs in the transmitted data, the comparator 158 can detect (misdetect) the coincident signal at a wrong position. In this case, the demultiplexer 155 will output either a part of the entire effective data in the frame as effective data, or data consisting of the entire effective data plus superfluous data following it. The transmitter and receiver of this embodiment, however, place the error detecting code in the fixed position in the frame, and hence, the probability of the misdetection can be reduced to a very small value by determining the number of bits of the error detecting code greater than that needed for detecting ordinary errors. In addition, limiting the number of bits allowed in one frame (for example, setting it at a multiple of two bits) will restrict the position at which the coincident signal of the comparator 158 is obtained, and this can further reduce the probability of outputting the coincident signal at a wrong position.

EMBODIMENT 2

FIGS. 6A and 6B are block diagrams showing a second embodiment of a transmitter and a receiver using the variable rate transmission method in accordance with the present invention. The second embodiment differs from the first embodiment in that it provides the transmission rate information from the transmitter to the receiver. More specifically, it differs in the following points.

(1) The transmitter is provided with a transmission rate information memory 113.

The transmission rate information memory 113 is a memory for storing the transmission rate information of the frame data held in the frame memory 103, that is, the information representing the number of bits of the frame data. The information is input to the transmission rate information memory 113 from a terminal 101B frame by frame. Thus, the transmitter sends the data of a variable bit number with the transmission rate information in a fixed frame period.

(2) The multiplexer 104 inserts the transmission rate information before the error detecting code.

Figure 7A:
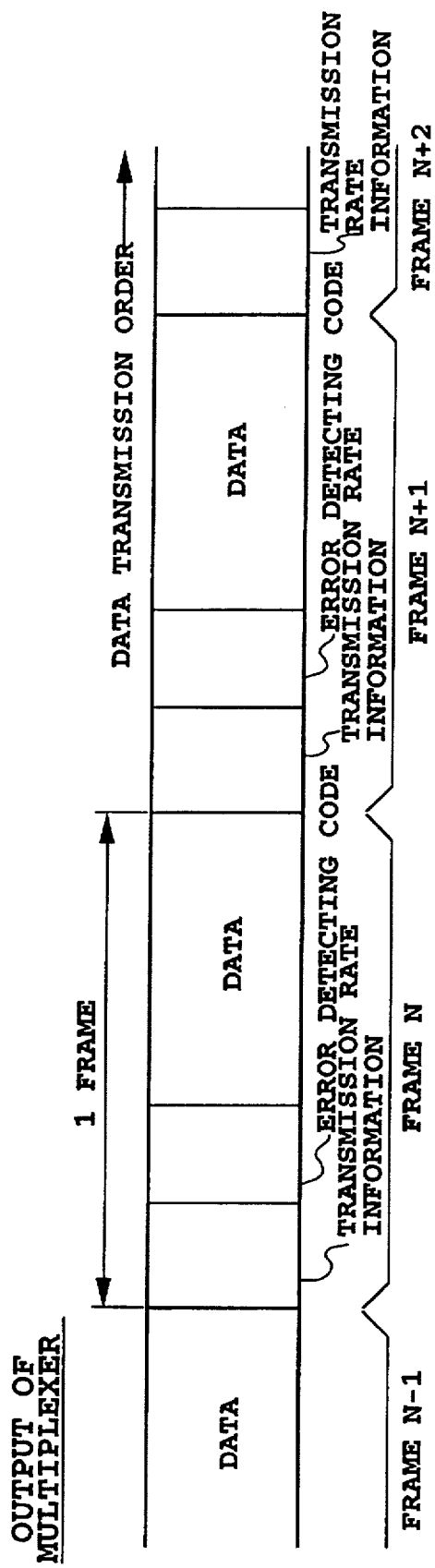
Figure 7B:
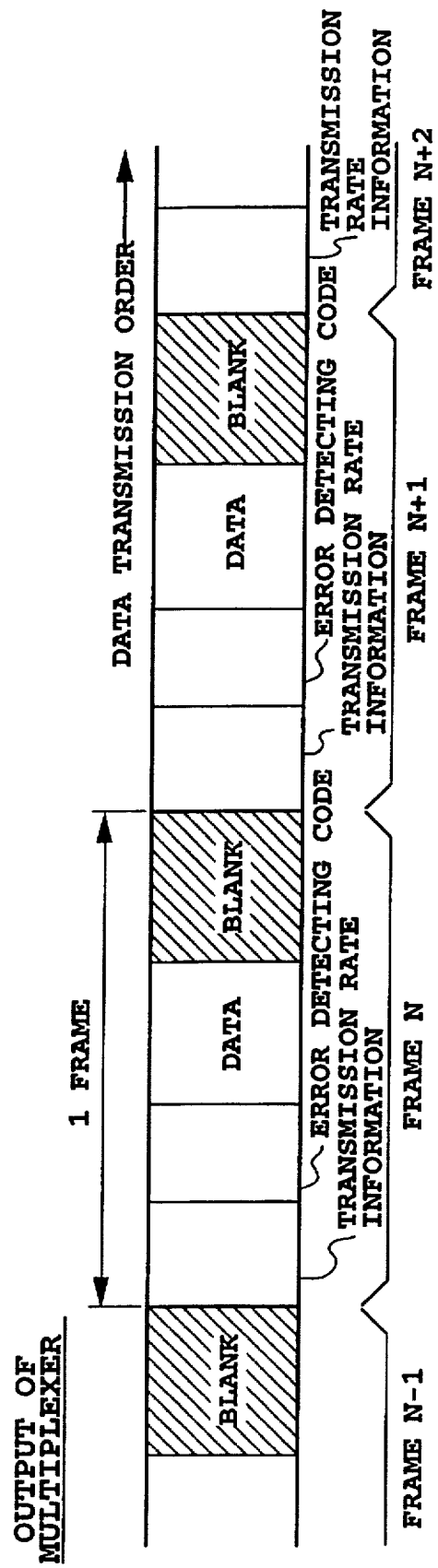

FIGS. 7A and 7B illustrate the output of the multiplexer 104. FIG. 7A illustrates the output when the transmission rate of the transmitted data is maximum, and FIG. 7B illustrates the output when the transmission rate is less than the maximum rate. In FIG. 7B, an idle time, that is, a blank including no data takes place in each frame. As shown in these figures, each frame consists of the transmission rate information, the error detecting code and the transmitted data. The frame differs from that of the first embodiment in that it is provided with the transmission rate information preceding the error detecting code.

(3) The receiver is also provided with a transmission rate information memory 161.

The transmission rate information memory 161 stores the transmission rate information extracted from the received data fed from the error correcting decoder 154.

With such an arrangement, the transmitter sends the data as shown in FIGS. 7A and 7B, after interleaving, modulating and spreading it.

The receiver despreads, demodulates and deinterleaves the received data as in the first embodiment. Thus, the original data sequence of one frame is recovered, and the transmission rate information, the error detecting code and the transmitted data sequence are obtained. These are fed to the error correcting decoder 154 to undergo the error correcting encoding.

The transmission rate information contained in the recovered output of the error correcting decoder 154 is input to the transmission rate information memory 161 to be stored, and is output from the terminal 162. On the other hand, the transmitted data sequence and the error detecting code are separated by the demultiplexer 155. The transmitted data is fed to the error detecting encoder 156, and the terminal 159 from which it is output as the received data. On the other hand, the error detecting code is input to the error detecting code memory 157 to be stored.

The error detecting encoder 156 carries out the same error detecting encoding as that of the transmitter to the last bit of the input data sequence. The last bit is fed from the transmission rate information memory 161. This is the very point which differs from the first embodiment. After that, the processing proceeds as in the first embodiment The comparator 158 compares the error detecting code output from the error detecting encoder 156 with the contents of the error detecting code memory 157 bit by bit, and outputs the coincident signal from the terminal 160 when all the bits agree with each other If no error occurs during the transmission, the coincident signal is output to the terminal 160, in which case, it is decided that the transmitted data in the frame output from the terminal 159, and the transmission rate information output from the terminal 162 are both received correctly.

When using a convolutional code as the error correcting code, and the maximum likelihood decoding as the decoding processing in this embodiment, the decoded result of the transmission rate information is first obtained by sequentially applying the maximum likelihood decoding, and then the error correcting decoding of the transmitted data is carried out to the last bit designated by the transmission rate information In this case, increasing reliability is obtained of the decoded result of the transmission rate information as the input signal stored in the decoder increases, that is, as the encoded data sequence following the transmission rate data increases, because of the characteristics of the decoder. For this reason, it is preferable that the greatest possible fixed length data sequence such as error detecting code other than the transmitted data be placed immediately after the transmission rate information without interruption.

Alternatively, the following method can be used to decode the transmitted data to the last bit. The transmitter adds tail bits immediately after the last bit, and performs the error correcting encoding on them The receiver completes the error correcting decoding with the tail bits. Alternatively, the transmitter can insert the tail bits after the transmission rate information to be transmitted, and the receiver can once complete decoding at the tail bits, and then restart the decoding of the transmitted data to the last bit.

In the processing described above, processings such as deinterleaving, error correcting decoding and error detecting encoding are carried out successively after writing the input data sequence of one frame into the frame memory 153A of the deinterleaver 153. Accordingly, the transmitted data sequence is delayed by an amount of one frame interval involved in the deinterleaving plus the processing time.

To avoid such a delay, the following method can be taken. First, the transmitter places the transmission rate information associated with the current frame at the initial position of the preceding frame, which transmission rate information is stored in the transmission rate information memory 113. On the other hand, the receiver obtains the last bit of the transmitted data of the current frame on the basis of the transmission rate information in the preceding frame stored in the transmission rate information memory 161.

Figure 8A:
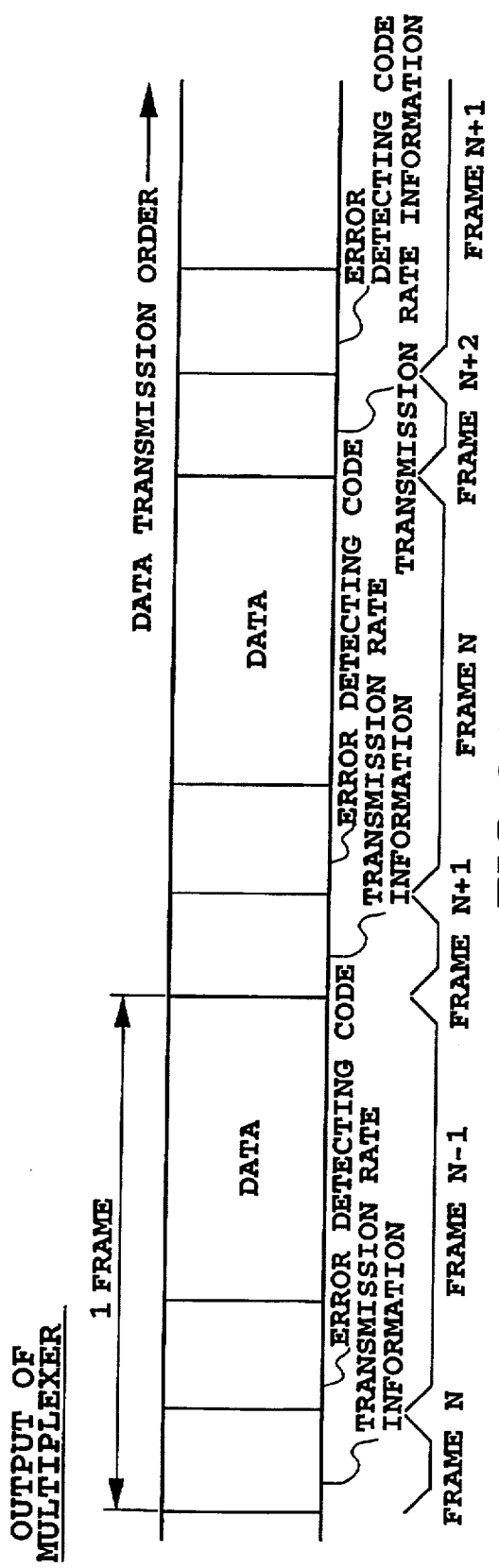
FIGS. 8A and 8B are schematic diagrams illustrating data sequences output from the multiplexer 104 of FIG. 6A when transmission rate information is held in the preceding frame.
Figure 8B:
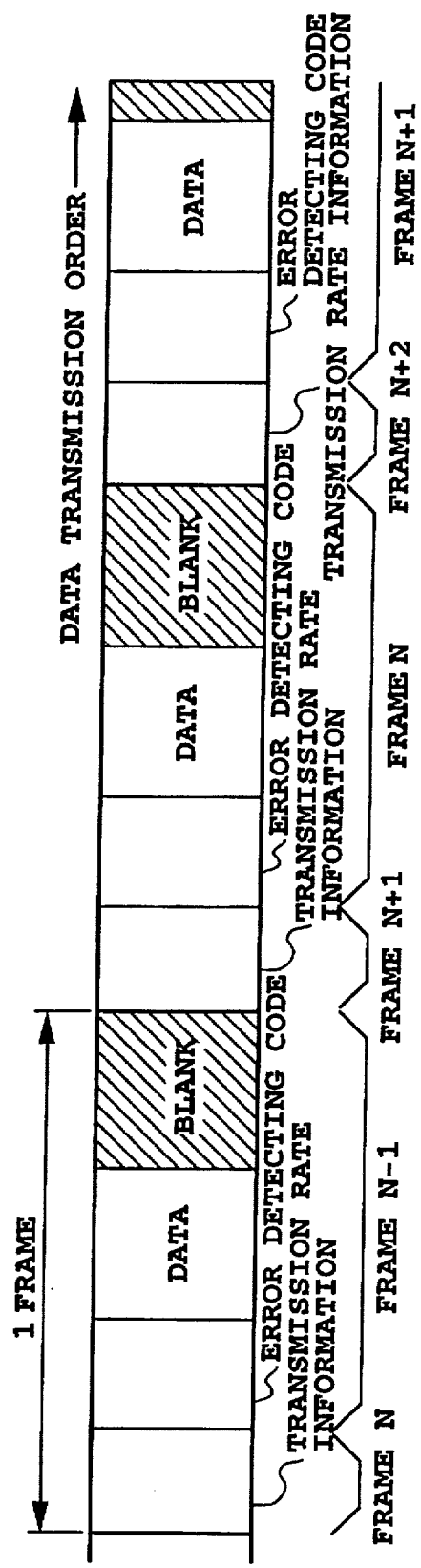

FIGS. 8A and 8B show the data sequence output from the multiplexer 104 of the transmitter in this case. When the transmission rate information is sent by the preceding frame, the receiver can obtain the number of bits of the effective data of the current frame before deinterleaving it. This makes it possible to eliminate the frame delay involved in the deinterleaving. As a result, the power of the received signal can be measured precisely during the transmission of the current effective data. This is required to achieve the transmission power control, in which the power of the received signal must be measured with minimum delay time to be fed back to the transmitting side.

To transmit the transmission rate information by the preceding frame, a dummy frame is required to send the transmission rate information of the first frame at the beginning of the successive data transmission.

According to the transmitter and receiver described above, the receiver performs the reencoding and coincident detection of the error detecting code to confirm the effectiveness of the transmitted data for each frame. Therefore, even if the received transmission rate information (that is, information representative of the number of transmitted bits in the frame) is wrong, the possibility (misdetection) of outputting transmitted data of wrong length can be reduced to a minimum. This makes possible to achieve a highly reliable, variable rate data transmission.

When a data sequence is transmitted at a low transmission rate by the transmitter and receiver of the above-described first and second embodiments, an amount of the transmitted data per frame reduces. In such a case, a burst transmission occurs in which short data sequence is transmitted intermittently because the frame length is fixed. If it is known in advance that the number of bits (the total bits of the error detecting code and the data sequence) per frame is equal to or less than $1/K$ of the maximum bits of the frame where K is a positive integer, the burst mode transmission can be avoided by sending the data sequence with its individual bits repeated K times after carrying out the error correcting encoding of the data sequence. The following embodiments are an example of such a data transmission.

EMBODIMENT 3

FIGS. 9A and 9B are block diagrams showing a third embodiment of the transmitter and receiver using the variable rate transmission method in accordance with the present invention.

This embodiment mainly differs from the first embodiment as shown in FIGS. 1A and 1B in the following.

(1) The transmitter is provided with a repeater 121 connected next to the error correcting encoder 105.

As shown in FIG. 10(C), the repeater 121 has a function to repeat each bit in the frame K times (twice in FIG. 10(C)). Thus, a new data sequence is generated in which the bits of the output data from the error correcting encoder 105 as shown in FIG. 10(B) are each repeated K times.

(2) A multiplier 123 for controlling the transmission power is connected between the primary modulator 108 and the secondary modulator 109.

The data output from the repeater 121 is interleaved by the interleaver 106, followed by primary and secondary modulation, and the transmission thereof. Since the same bit is transmitted K times, the average transmission power of the bit increases by a factor of K as compared with the transmission power when repeating is not performed. The average transmission power is proportional to the power of interference to other users. To prevent the average transmission power increase due to the repetition of bits, the system in FIG. 9A is provided with the multiplier 123 connected after the primary modulator 108 so that the output of the primary modulator 108 is multiplied by the power factor of $1/K$.

(3) The receiver is provided with an integrator 171 and a thinning out circuit 172, which are connected immediately after the deinterleaver 153.

The integrator 171 obtains an integral for each continuous K symbols of the deinterleaved received data sequence. The thinning out circuit 172 thins out the integrated output at every K symbol interval, and outputs the result. Both the circuits 171 and 172 carry out this processing only to the repeated portion of the transmitted data so that the other additional bits are passed without change.

The operation of the embodiment will now be described. FIG. 10(A) shows the output of the multiplexer 104. Such arrangement of the frame including blanks will cause burst mode transmission. To avoid this, the error detecting code and transmitted data output from the error correcting encoder 105 (FIG. 10(B)) are input to the repeater 121 which repeats each bit K times (FIG. 10(C)). The repeating coefficient K is set so that the frame is filled as much as possible (K=2 in FIG. 10). Transmitting the output of the repeater 121 can eliminate the burst mode transmission.

On the other hand, the receiver recovers the same data sequence as the output of the error correcting encoder 105 of the transmitter through the integrator 171 and the thinning out circuit 172. After that, the same processing as that of the first embodiment is carried out, thereby resulting in the final received data sequence.

The number K of repetition used in the receiver must be identical to that used in the transmitter. Accordingly, it is necessary to send K to the receiver before the data transmission.

This embodiment can achieve the variable rate transmission without the burst mode transmission even if the data transmission rate is substantially lower than the maximum rate.

EMBODIMENT 4

FIGS. 11A and 11B are block diagrams showing a fourth embodiment of the transmitter and receiver using the variable rate transmission method in accordance with the present invention.

This embodiment is a combination of the second and third embodiments. Specifically, the transmission rate information memory 113 and transmission rate information memory 161 are added to the transmitter and receiver of the third embodiment, respectively.

FIG. 12 is a diagram corresponding to FIG. 10 of the second embodiment. The present embodiment is characterized in that the transmission rate information is inserted immediately before the transmitted data. Since the other operation can be easily understood from the second and third embodiments, the description thereof will be omitted here.

EMBODIMENT 5

Figure 25:
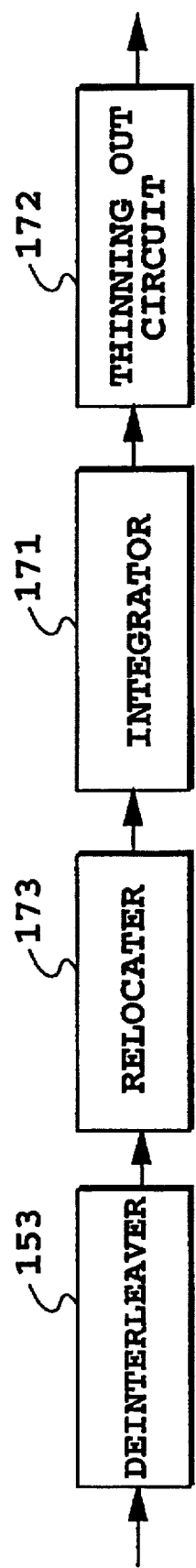
FIG. 25 is a block diagram showing the major portion of the receiver of the fifth embodiment.

In the third and fourth embodiments described above, the individual bits are repeated K times bit by bit. This, however, is not essential. For example, as shown in FIG. 13, each predetermined number of bits (4 bits in FIG. 13) can be repeated K times (twice in FIG. 13) as a set. In the receiver as shown in FIG. 25, a relocater 173 is connected between the deinterleaver 153 and the integrator 171, so that the relocater 173 extracts the same bit, and the integrator 171 integrates over every K bit interval. The other configuration is the same as that of FIG. 9B.

This embodiment can achieve the same effect as that of the fourth embodiment.

The above described first to fifth embodiments do not use pilot symbols. The pilot symbols have a predetermined fixed pattern, and are sent intermittently with transmitted data into which the pilot symbols are inserted periodically, or sent continuously through a dedicated channel. A receiver extracts the pilot symbols of the known pattern, and estimates fading of transmission paths to compensate fluctuations of a received signal due to fading. The following embodiments relate to the variable rate transmission system including such pilot symbols.

EMBODIMENT 6

Figure 14A:
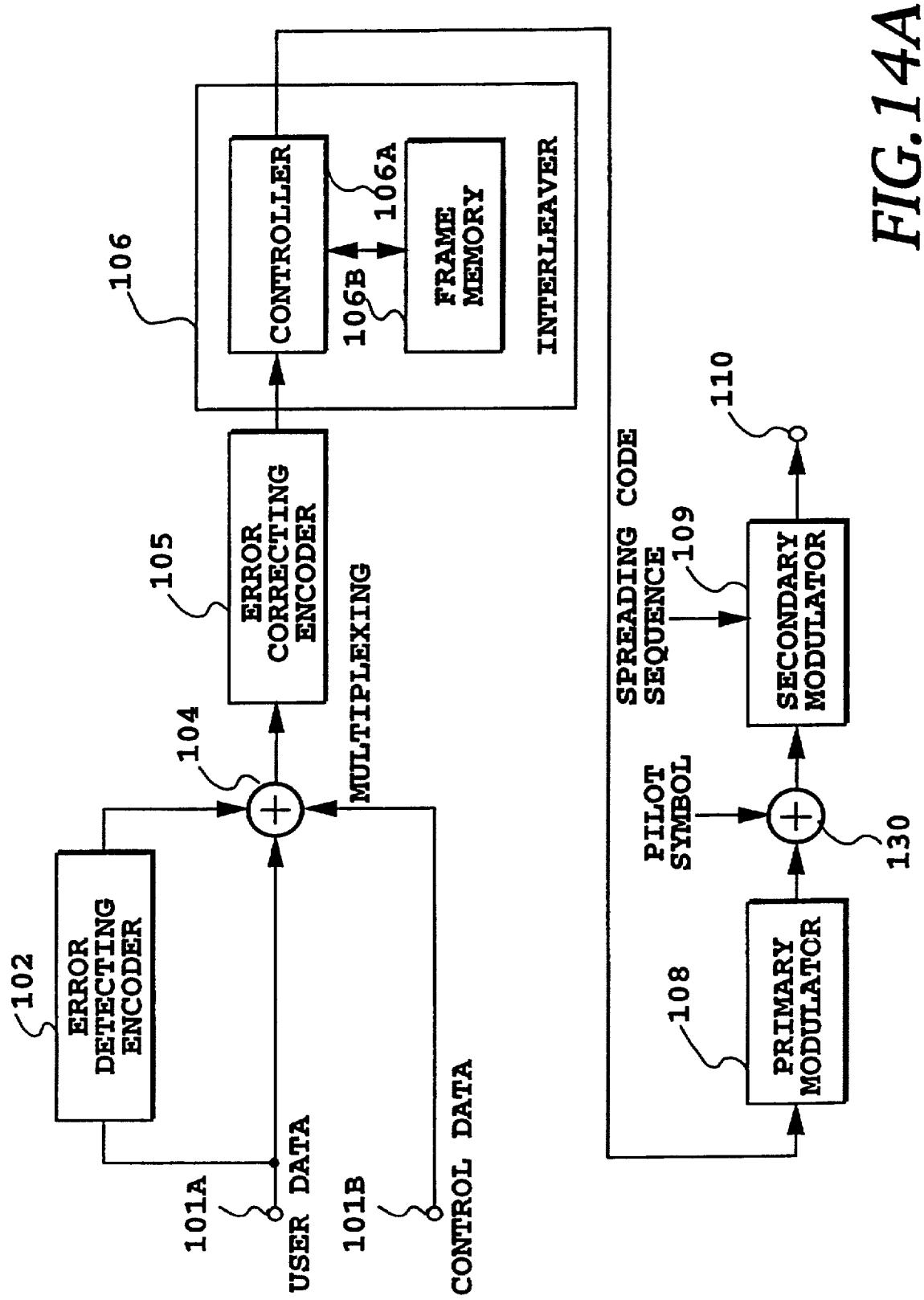
FIGS. 14A and 14B are block diagrams showing a sixth embodiment of a transmitter and a receiver using the variable rate transmission method in accordance with the present invention.
Figure 14B:
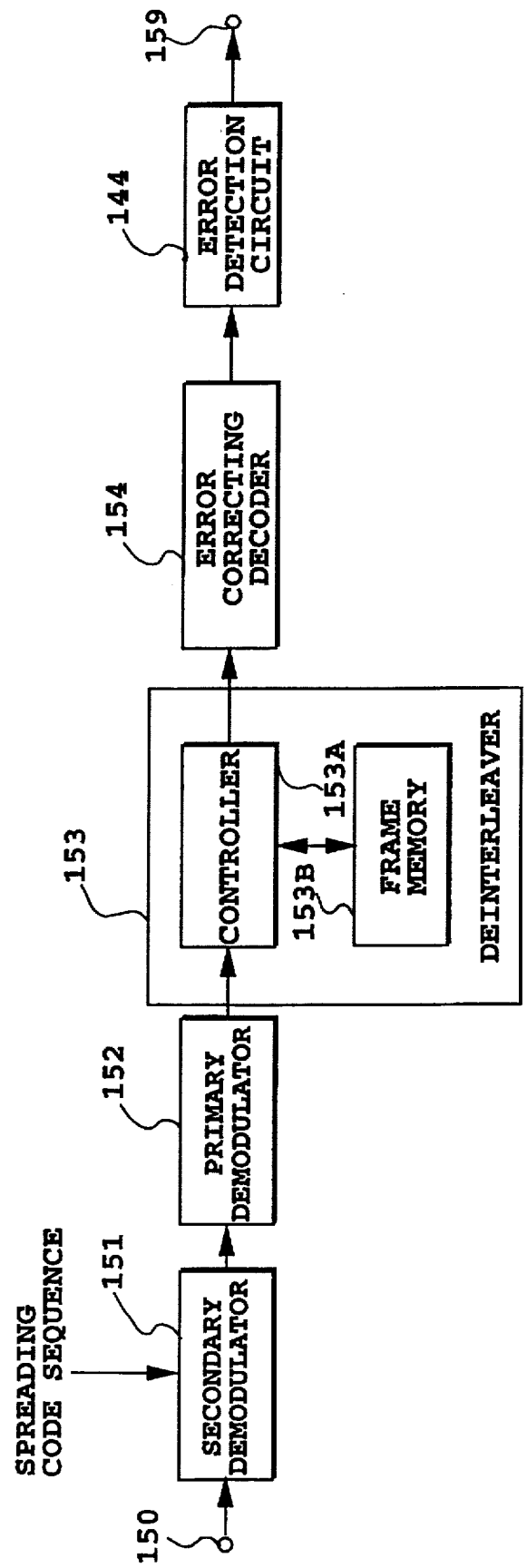

FIGS. 14A and 14B are block diagrams showing a sixth embodiment of the transmitter and receiver using the variable rate transmission method in accordance with the present invention.

The transmitter of FIG. 14A differs from that of FIG. 1A in the following.

(1) A pilot symbol inserting circuit 130 for inserting the pilot symbols is connected between the primary modulator 108 and the secondary modulator 109. The pilot symbol inserting circuit 130 will be described later with reference to FIG. 15A.

(2) The multiplexer 104 is supplied with control data from the input terminal 101B. The control data is important for a circuit connection or the like.

(3) The frame memory 103 is removed, and the user data is directly applied to the multiplexer 104 from the input terminal 101A.

On the other hand, the receiver as shown in FIG. 14B differs from the receiver as shown in FIG. 1B in the following.

(1) The primary demodulator 152 has a different configuration from that of FIG. 1B. This will be described later with reference to FIG. 15B.

(2) The position of the error detecting code in the frame is not specified in this embodiment, which differs from the first embodiment. Accordingly, the circuits from the demultiplexer 155 and forward are removed, and an error detection circuit 144 is connected to the output terminal of the error correcting decoder 154.

The error detection circuit 144 shifts the data in each frame bit by bit, successively divides the data by predetermined data, and decides that the error detecting code is detected at the point where the data can be divided. Since the length of the error detecting code is known in advance, the last bit of the transmitted data can be found by identifying the error detecting code. Thus, the transmitted data can be extracted.

Returning to FIG. 14A, the user data sequence applied to the input terminal 101A is divided into data with a duration of a predetermined frame period Tf. The error detecting encoder 102 calculates a check code (CRC bits, for example) for each frame of the user data, and supplies it to the multiplexer 104. The multiplexer 104 adds the control data fed from the input terminal 101B before the user data in each frame, and adds the check code from the error detecting encoder 102 at the end of the data in the frame, thereby forming one frame data.

Figure 16:
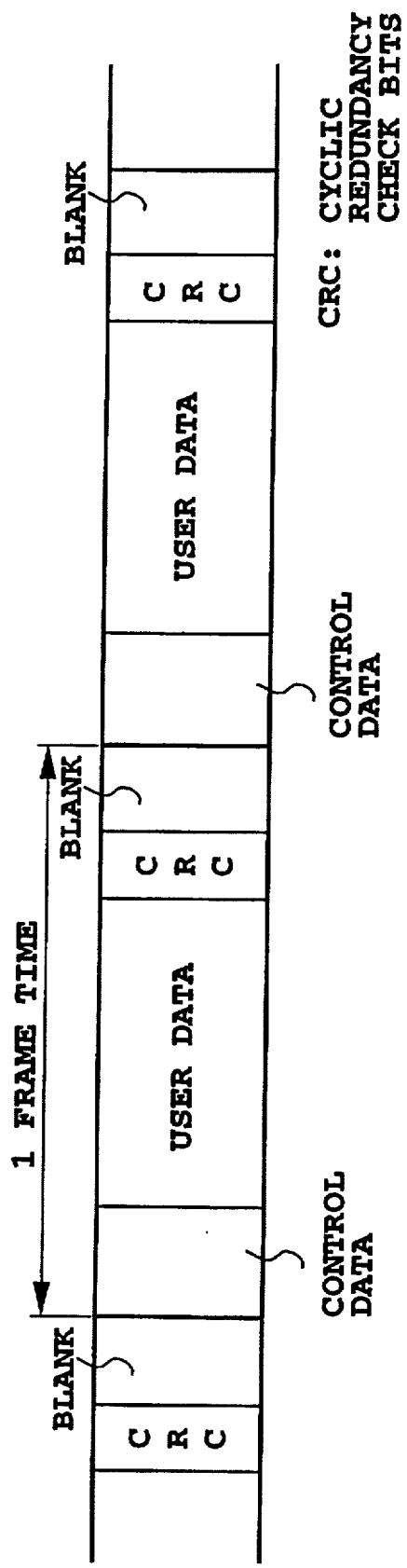
FIG. 16 is a schematic diagram illustrating the data structure output from the multiplexer 104 of FIG. 14A.

FIG. 16 illustrates the data output from the multiplexer 104. As shown in FIG. 16, blanks appear in the frame when the total bit number (which corresponds to the transmission rate) of the control data, user data and check code is less than the maximum bit number (maximum rate) that can be transmitted in one frame.

Figure 17:
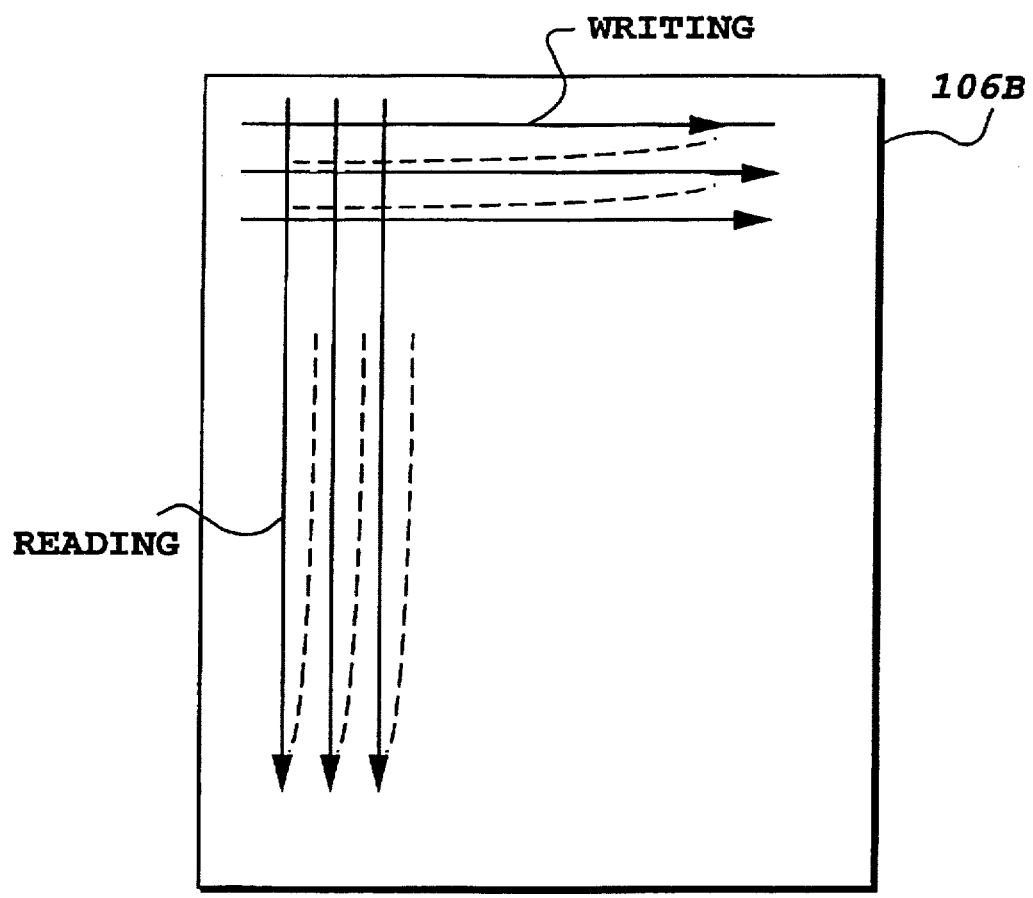
FIG. 17 is a schematic diagram illustrating the order of writing to and reading from the frame memory 106B of FIG. 14A.

The transmitted data of one frame undergoes error correcting encoding by the error correcting encoder 105, and is fed to the interleaver 106. The interleaver 106 reads the data of one frame which has been written in the frame memory 106B in the direction different from the writing direction as shown in FIG. 17. That is, the transmitted data of one frame written in the row direction of the interleaver 106 is read in the column direction at a predetermined rate.

The read data undergoes phase modulation by the primary modulator 108, and is fed to the pilot symbol inserting circuit 130. The pilot symbol inserting circuit 130 periodically inserts the pilot symbols of a known pattern into the data supplied, thereby forming a modulated symbol sequence.

Figure 15A:
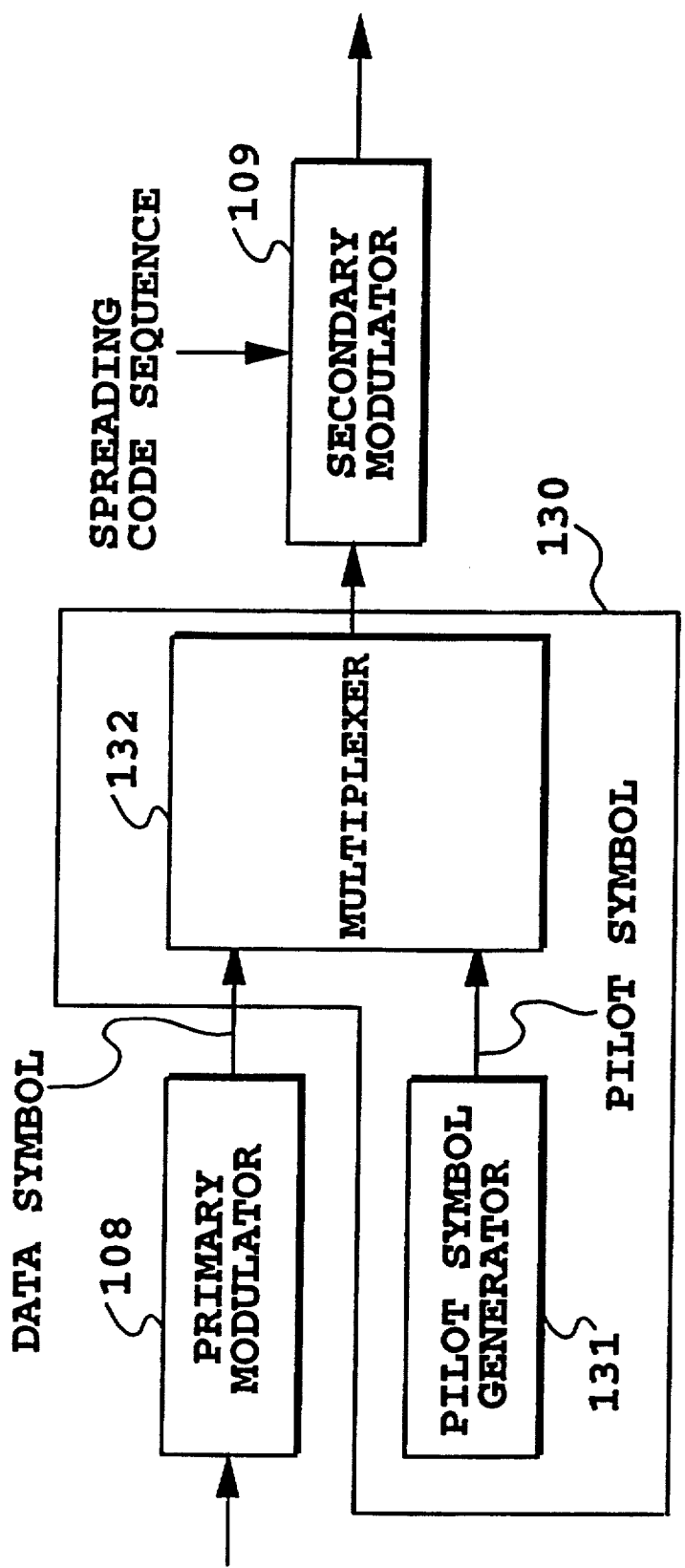
FIG. 15A is a block diagram showing the arrangement of a pilot symbol inserting block 130 of FIG. 14A.

FIG. 15A is a block diagram showing the configuration of the pilot symbol inserting circuit 130. The pilot symbols of a known pattern, which are periodically generated by a pilot symbol generator 131, are fed to a multiplexer 132. The multiplexer 132 multiplexes the data fed from the primary modulator 108 and the pilot symbols, thereby generating a modulated symbol sequence.

Figure 18:
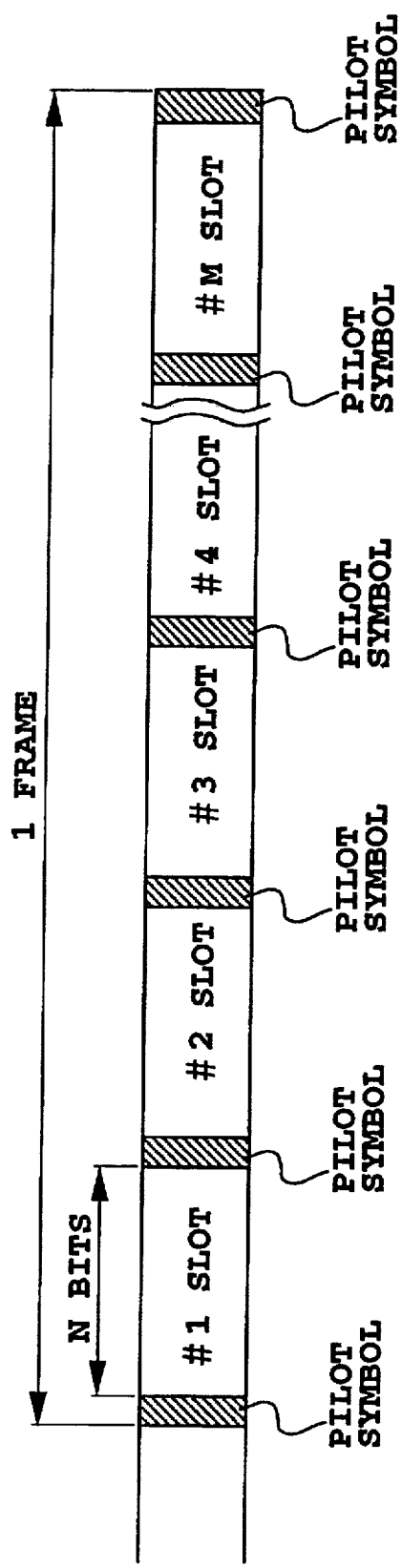
FIG. 18 is a schematic diagram illustrating a modulated symbol sequence output from the pilot symbol inserting block 130 of FIG. 14A.

FIG. 18 illustrates the arrangement of the modulated symbol sequence. In FIG. 18, a section sandwiched by the pilot symbols which are inserted periodically is called a slot. Assuming that one slot consists of N bits and one frame consists of M slots, one frame consists of N*M bits.

The modulated symbol sequence is fed to the secondary modulator 109. The secondary modulator 109 multiplies the modulated symbol sequence by a spread code sequence with a chip rate of integer (tens to several hundreds) times the symbol rate, and delivers it from the output terminal 110 to a transmission power amplifier.

The receiver, receiving the pilot symbols of the known pattern which have been periodically inserted into the data to be transmitted, estimates the phase of each symbol in the slot, and corrects the phase by using the pilot symbols. This compensates the phase of each symbol varied by the fading in the transmission. This processing is carried out by the primary demodulator 152.

Figure 15B:
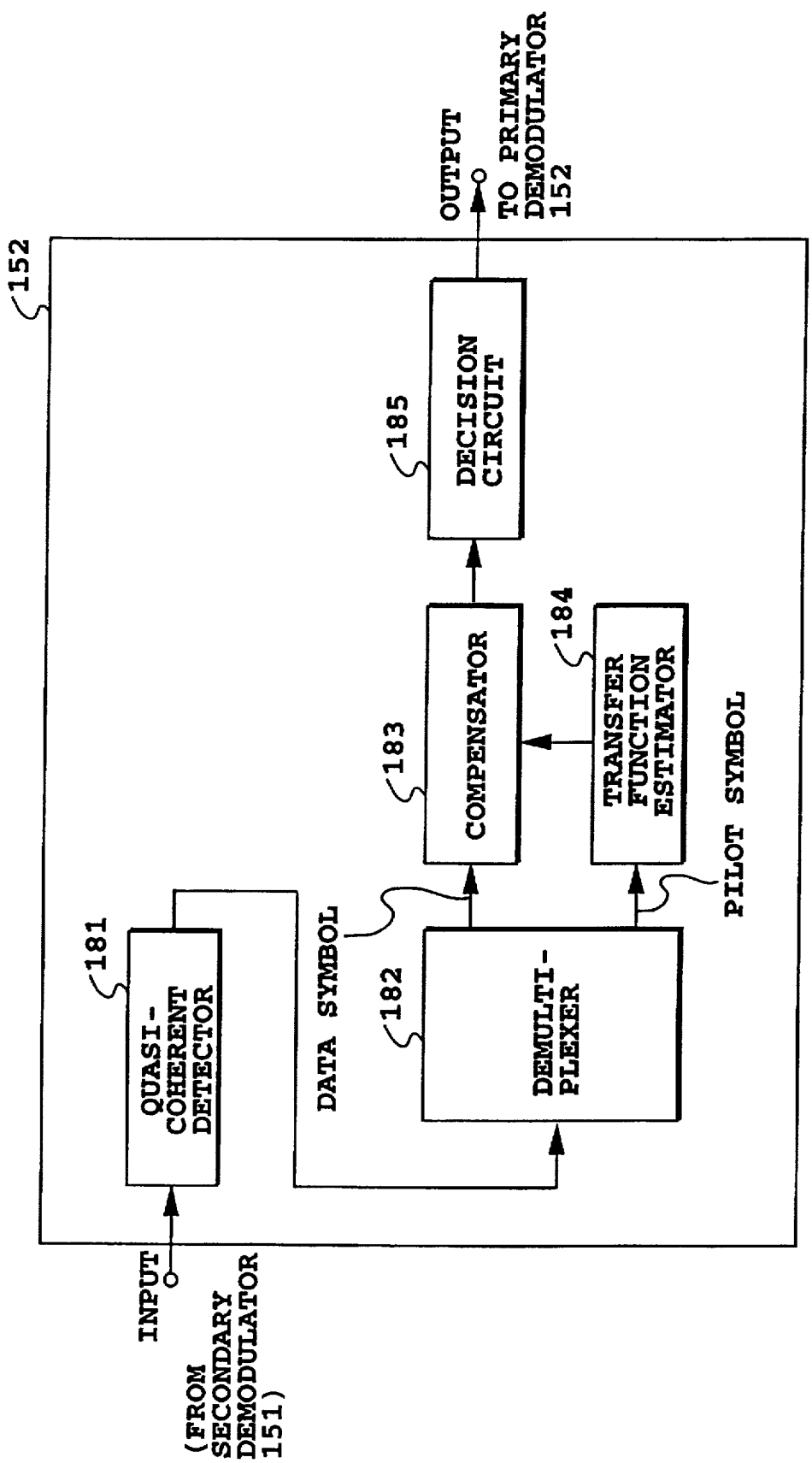
FIG. 15B is a block diagram showing the arrangement of a primary demodulator 152 of FIG. 14B.

FIG. 15B is a block diagram showing the configuration of the primary demodulator 152. The despread signal fed from the secondary demodulator 151 is supplied to the quasi-coherent detector 181. The quasi-coherent detector 181 quasi-coherent detects the despread signal using the carrier of the same frequency as that of the transmitter, and supplies the detected output to a demultiplexer 182. The demultiplexer 182 divides the data obtained by the quasi-coherent detection into data symbols and the pilot symbols, and supplies the data symbols to a compensator 183 and the pilot symbols to a transfer function estimator 184.

The transfer function estimator 184 estimates the transfer function of the propagation path from the pilot symbols, and supplies the transfer function to the compensator 183. The compensator 183 compensates the phases of the data symbols in response to the estimated transfer function, and provides the compensated output to a decision circuit 185. The decision circuit 185 decides the compensated data, and outputs the data symbols. Details of this processing is disclosed in the above-mentioned paper of S. Sampei.

In the case where the pilot symbols are thus periodically inserted into the transmitted data to achieve the coherent detection, the accuracy of the estimation of the transmission path is best near the pilot symbols. Therefore, such data that requires high quality transmission should be placed near the pilot symbols before transmission in this embodiment. Specifically, writing to and reading from the frame memory 106B of the interleaver 106 in FIG. 14A is controlled so that the important data which requires high quality transmission, such as the control data is placed in the neighborhood of the pilot signals.

Figure 19:
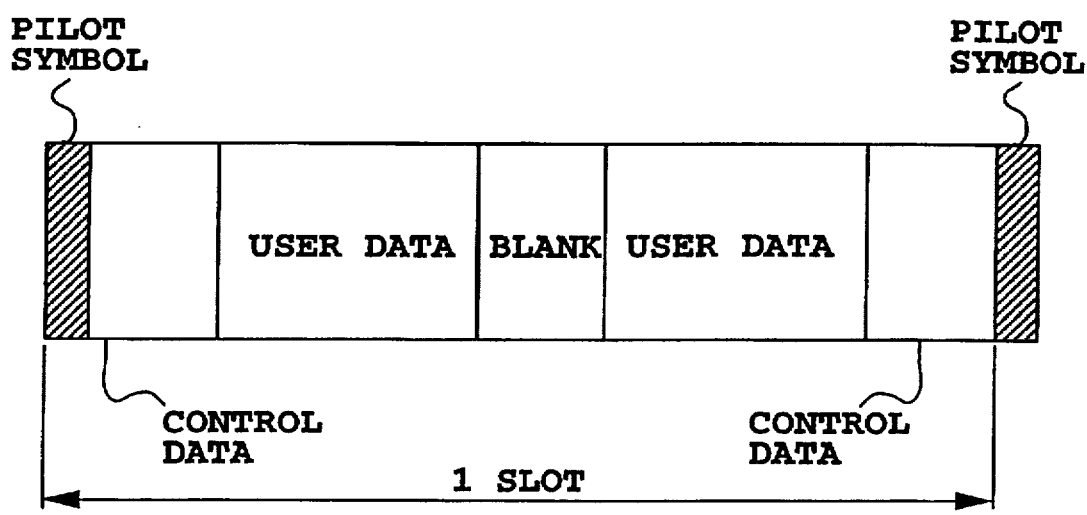
FIG. 19 is a schematic diagram illustrating the slot structure of the sixth embodiment.

This processing will now be described with reference to FIGS. 3 and 19.

As described before, FIG. 3 illustrates the arrangement of the frame data in the frame memory 106B of the interleaver 106. The number of bits in a row of the frame memory 106B is assumed to be equal to the number of slots M constituting one frame. In addition, the number of bits (that is, the number of rows) in one column is assumed to be equal to the number of bits N of one slot. One frame data including the check code for error detection is written bit by bit into the row direction of the frame memory 106B which is represented in the form of two-dimensions. The writing of one frame is carried out alternately from the top and bottom of the frame memory 106B row by row. The numbers attached to the rows of FIG. 3 represent the writing order. Since the control data is placed at the initial position of the frame, it is written in the rows of low numbers. In other words, this important data is written at the initial and final positions of the frame in the frame memory 106B.

On the other hand, the data in the frame memory 106B is read in the column direction bit by bit. The column numbers 1–M correspond to the slot numbers of FIG. 18. By thus reading the data from the frame memory 106B, the important data (control data) will be mapped near the pilot symbols in each slot as shown in FIG. 19. In FIG. 19, a blank appears in the slot, which corresponds to the blank of each frame in FIG. 16.

The receiver is provided with the deinterleaver 153 in correspondence with the interleaver 106. The deinterleaver 153 recovers the frame data from the slot data in the procedure opposite to that of the interleaver 106.

By thus transmitting the data, the important control data can be transmitted in the portions near the pilot symbols at which errors will least occur.

The error rate of the received data reduces as the received power increases. Thus, the data error rate can be reduced by controlling the transmission power in accordance with the degree of importance of the transmitted data. The following seventh embodiment is implemented along the lines of this.

EMBODIMENT 7

Figure 20:
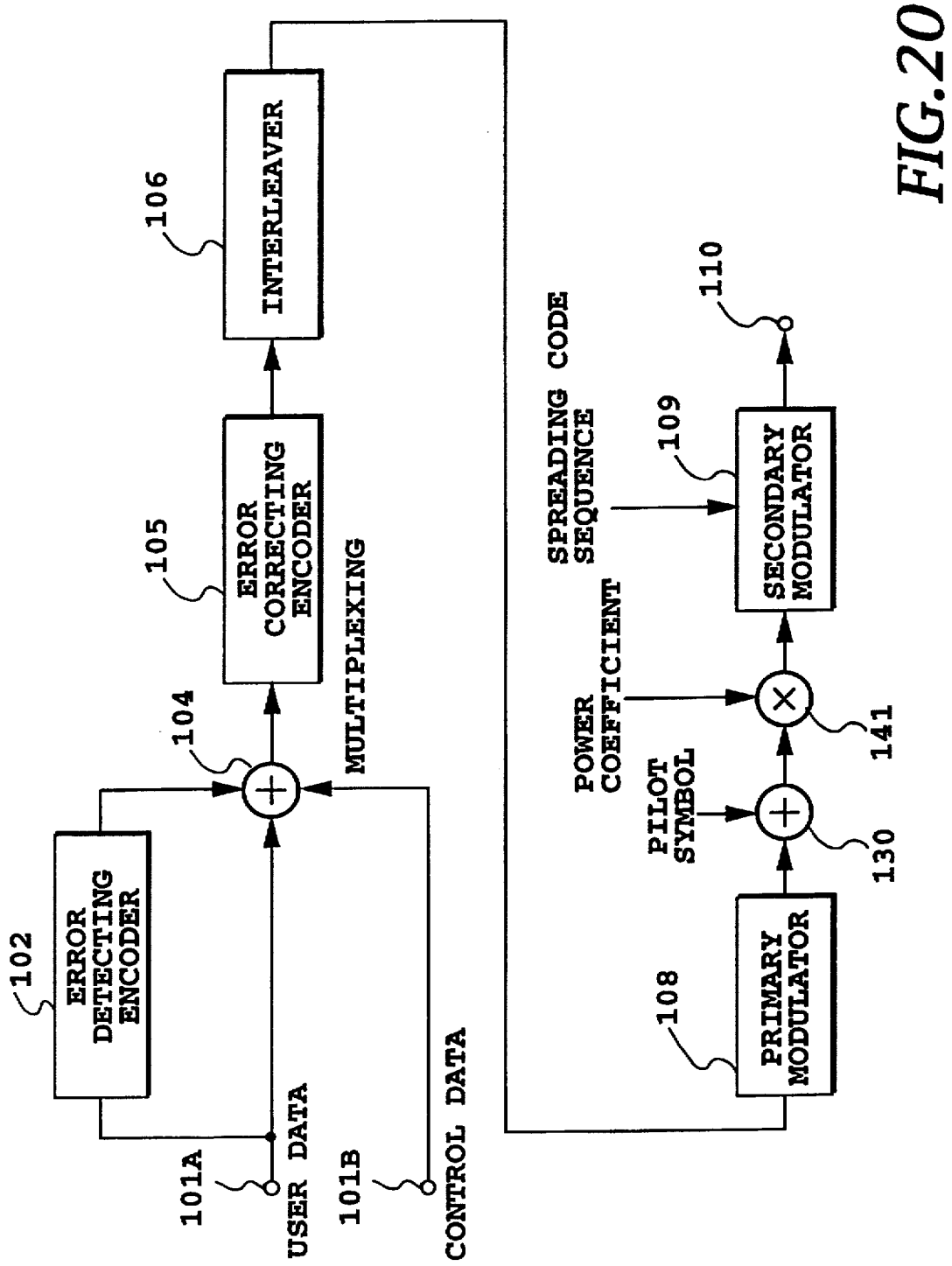
FIG. 20 is a block diagram showing a seventh embodiment of a transmitter using the variable rate transmission method in accordance with the present invention.

FIG. 20 is a block diagram showing the seventh embodiment of the transmitter using the variable rate transmission method in accordance with the present invention. The transmitter differs from the transmitter of the sixth embodiment shown in FIG. 14A in that it is provided with a multiplier 141 next to the pilot symbol inserting circuit 130. The multiplier 141 multiplies the output of the pilot symbol inserting circuit 130 as shown in FIG. 19 by a predetermined power coefficient. The multiplier 141 multiplies a larger power coefficient as the degree of importance of the data increases. For example, the important pilot symbols and control data thereabout are multiplied by a maximum power coefficient.

Figure 21:
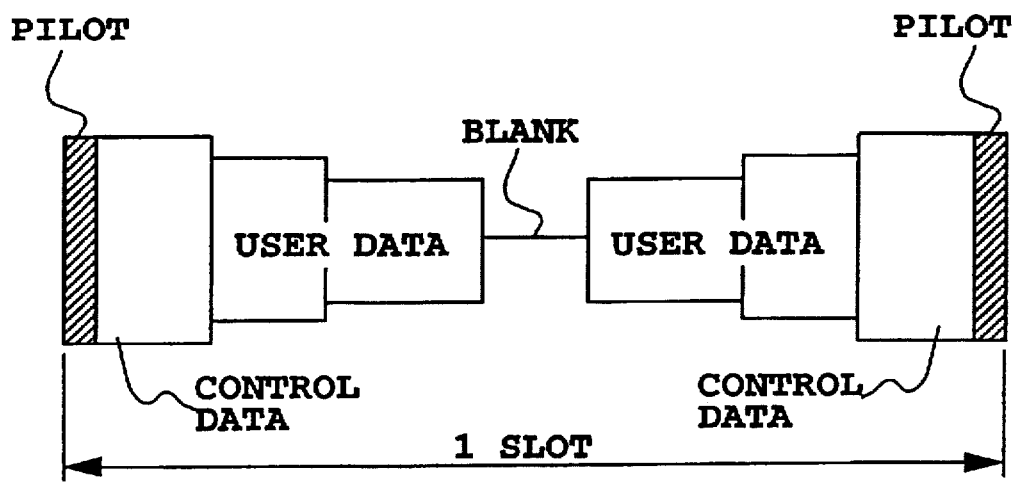
FIG. 21 is a schematic diagram illustrating power transmission control in the seventh embodiment.

FIG. 21 is a schematic diagram illustrating the relationships between the types of data and the power coefficients. Predetermined numbers of bits are assigned to respective data in accordance with their types except for the blanks. The blanks are filled with a particular code to distinguish them from the other portions, and are multiplied by zero so that they are not transmitted. In other words, when the code representing the blanks, the power coefficient is placed zero so that their transmission is suppressed.

Although the multiplier 141 of the power coefficient is inserted before the secondary modulator 109, it can be placed after the secondary modulator 109.

FIG. 21 illustrates the control behavior of the transmission power in accordance with the degree of importance of the data. By thus controlling the transmission power, the important data are transmitted with larger transmission power, which makes it possible to reduce the error rate. In addition, since the blanks are not transmitted, extra transmission power can be suppressed. As a result, interference to other users are reduced, and the number of users accommodated in a given frequency band can be increased by that amount.

EMBODIMENT 8

Figure 22:
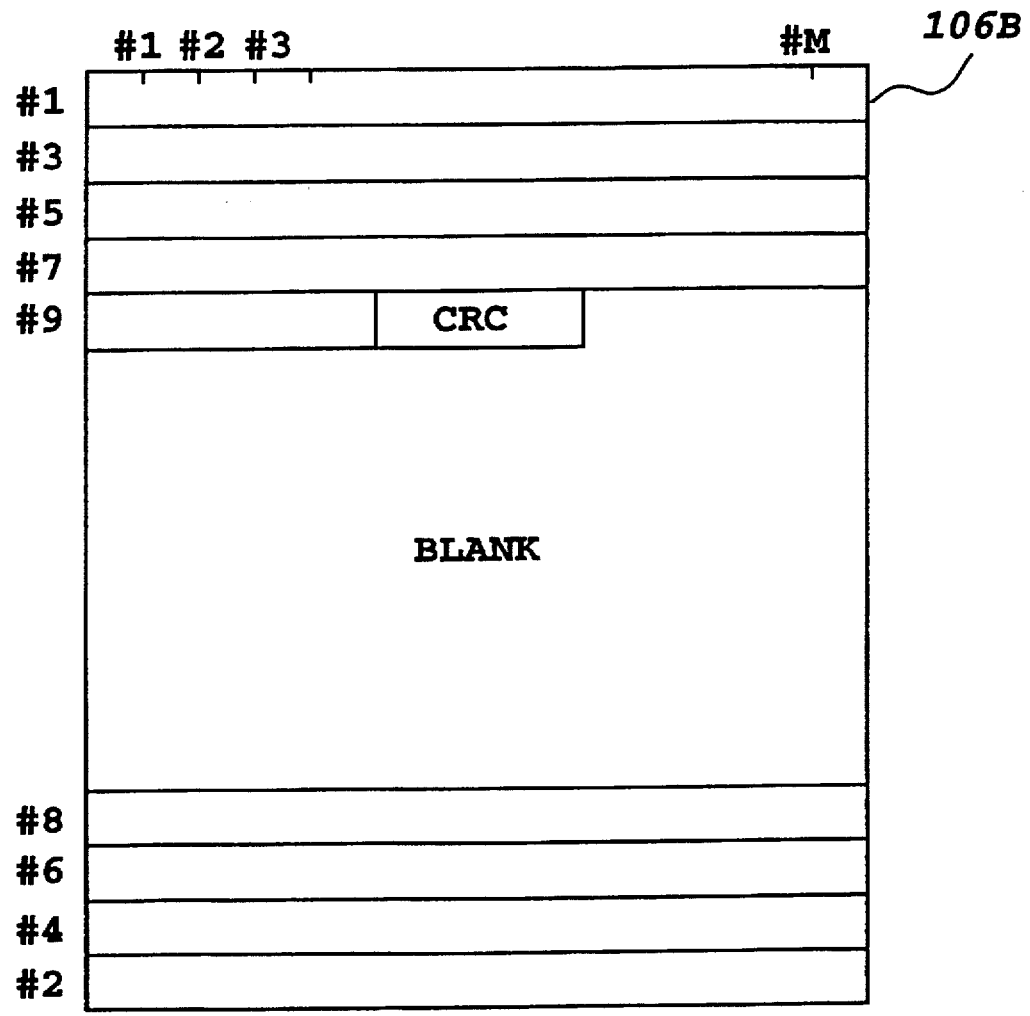
FIG. 22 is a schematic diagram illustrating an example of data stored in the frame memory 106B in an eighth embodiment of a transmitter using the variable rate transmission method in accordance with the present invention.
Figure 23:
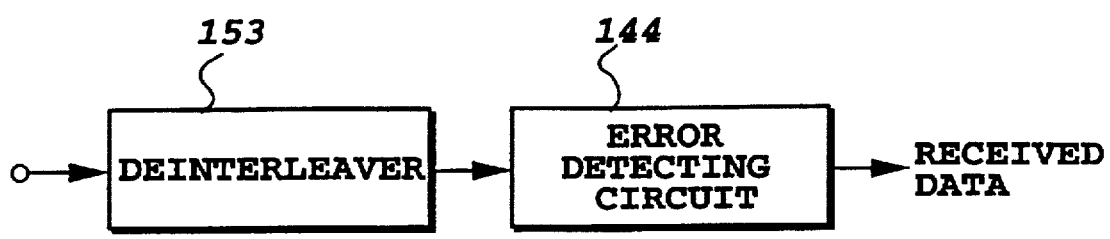
FIG. 23 is a block diagram showing the major portion of the receiver of the eighth embodiment.

The foregoing first embodiment describes an example which transmits the data at various rates without providing the party with the transmission rate information representing the number of bits of the data in each frame. FIGS. 22 and 23 show another embodiment which does not send the transmission rate information to the receiver.

The transmitter of this embodiment is similar to that of the seventh embodiment as shown in FIG. 20. FIG. 22 illustrates the transmitted bit sequence written in the frame memory of the interleaver 106 of the transmitter when the transmission rate is less than the maximum transmission rate of the transmitter. The error detecting code (check code) is added to the end of the transmitted data in each frame, and a blank follows that.

In the transmission, the transmitted data in the frame memory 106B is read column by column at a fixed rate, and is sequentially mapped to each slot to be sent. In FIG. 22, the space in which the transmitted data is absent corresponds to the blank in each slot. The primary modulator 108 does not modulate the blanks. As a result, the transmitted data of the variable bit number is transmitted in a fixed frame interval, at a constant transmission rate.

FIG. 23 shows the major portion of the receiver for receiving the data thus transmitted. The receiver recovers the data of each frame by the deinterleaver 153 in the opposite procedure as that of the interleaver 106 in the transmitter. The procedure is the same as that of the first embodiment.

The data of one frame is fed to the error detection circuit 144 connected to the output of the interleaver 106. The error detection circuit 144 detects the last bit of the transmitted data in the manner as described before. More specifically, the error detection circuit 144, shifting the data in the frame bit by bit, successively divides the data by the predetermined data, and decides that the error detecting code is received and the correct transmitted data is obtained at the point at which the data can be divided. The transmitted original data is obtained when the received data is output at that point.

Transmitting and receiving in this way eliminates the need to send each time the transmission rate information representing the amount of data in each frame. In addition, the receiver can recover the data correctly even if the amount (apparent transmission rate) of the transmitted data in each frame varies. This is because even if the transmitted data is absent, the receiver can recognize this because of the fixed frame period.

Thus, the variable rate transmission is implemented in which the apparent transmission rate (actually the bit number of data) can vary from frame to frame, even if the transmission rate information is not sent. It is necessary for the conventional variable rate transmission which does not send the transmission rate information in advance, to pre-determine at intervals the values taken by the transmission rate, and this limits the number of transmission rates that can be handled. In contrast, this embodiment can achieve the transmission at any desired rates.

A decision that no error has occurred can be made at a wrong position if an error takes place in the transmission. In this case, only a part of the transmitted data may be output as the effective data, or the transmitted data plus superfluous random data may be output as the effective data. Taking account of this, the number of bits of the transmitted data can be set at intervals, and this will make it possible to reduce the erroneous output of the data because the error detecting points are spaced apart.

EMBODIMENT 9

This embodiment corresponds to the third embodiment, which avoids the burst mode transmission involved in the intermittent transmission of short data. If the transmission rate is equal to or less than 1/k of the maximum rate allowed by a single transmitting channel, the transmitted data undergoes the error correcting encoding, and each bit of the encoded data is repeated K times to form the frame data to be transmitted. The repetition number K is sent to the receiver at the beginning of the transmission.

Figure 24:
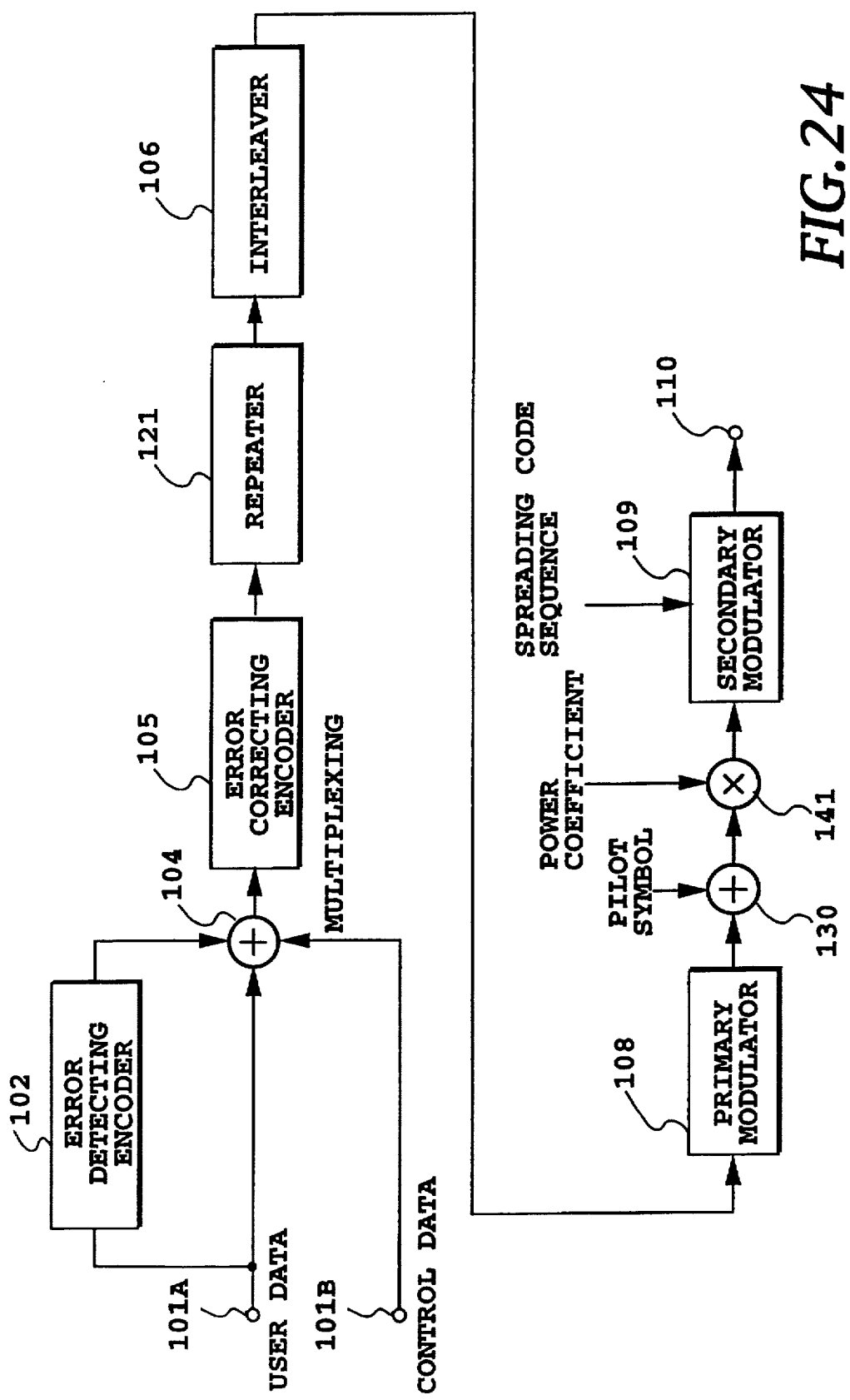
FIG. 24 is a block diagram showing a ninth embodiment of a transmitter using the variable rate transmission method in accordance with the present invention.

FIG. 24 shows the configuration of the transmitter. This embodiment differs from the transmitter of the seventh embodiment in the following.

(1) The repeater 121 is connected to the output of the error correcting encoder 105.

(2) The multiplier 141 is connected to the output of the pilot symbol inserting circuit 130 for multiplying the transmission power coefficient so that the transmission power is controlled to 1/k of that of the seventh embodiment as shown in FIG. 20, in which each bit of the data in the frame is not repeated.

The data transmitted by this transmitter is demodulated by a receiver similar to that as shown in FIG. 9B to recover the transmitted data.

By thus repeating each bit K times, the burst mode transmission can be avoided. In addition, the eighth embodiment can be used in combination with the ninth embodiment. In this case, if the repetition rate K has been sent to the receiver at the beginning of communications, the receiver can recover the transmitted data in accordance with the error detecting information even if the transmission rate varies frame by frame. Thus, excessive burst mode transmission can be avoided.

EMBODIMENT 10

A high speed data transmission requires to send data of more than N*M bits per frame. This will be handled by using a plurality of channels to carry out the parallel transmission of the data. The tenth embodiment is provided for achieving such a high speed transmission.

Figure 26:
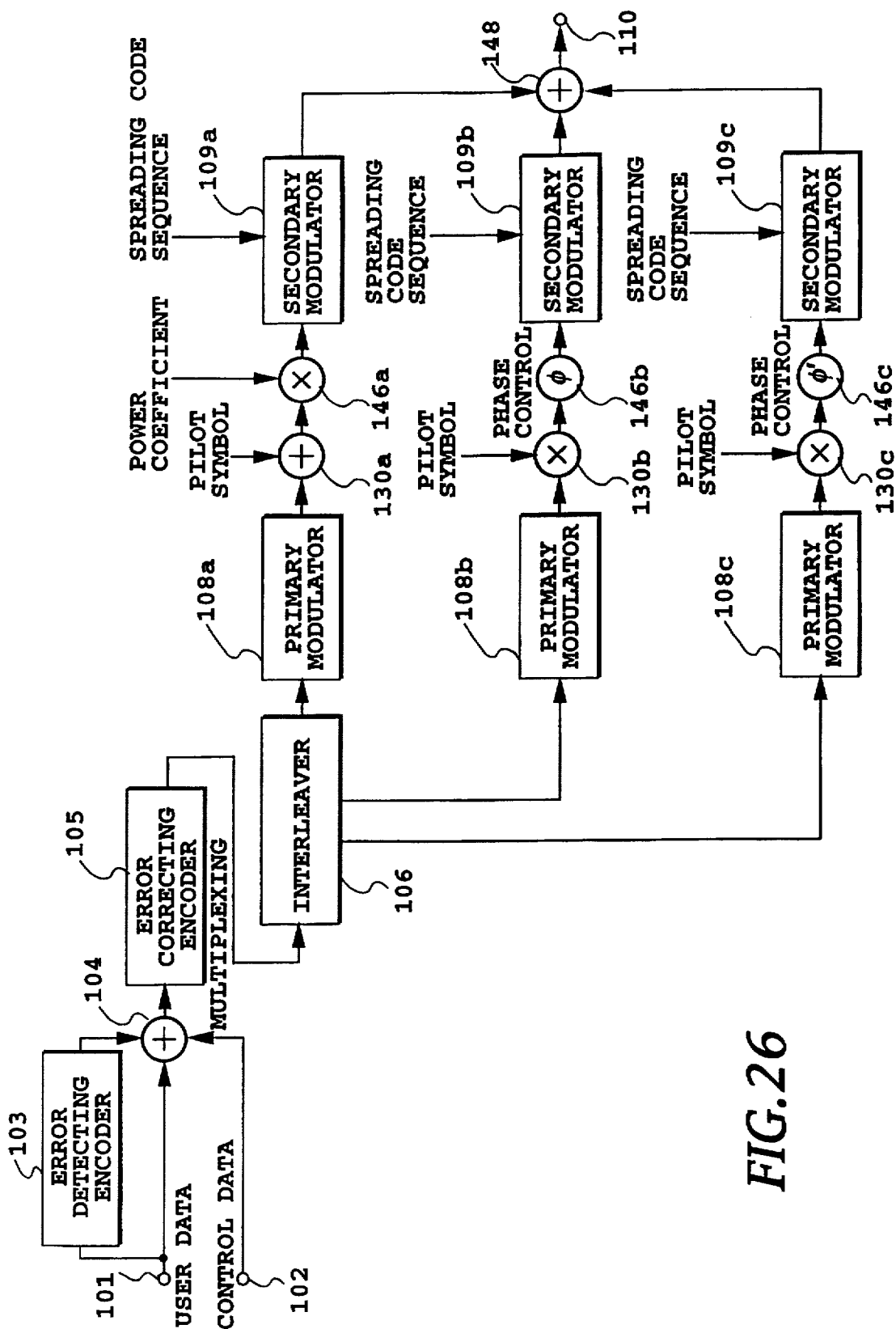
FIG. 26 is a block diagram showing a tenth embodiment of a transmitter using the variable rate transmission method in accordance with the present invention.
Figure 27:
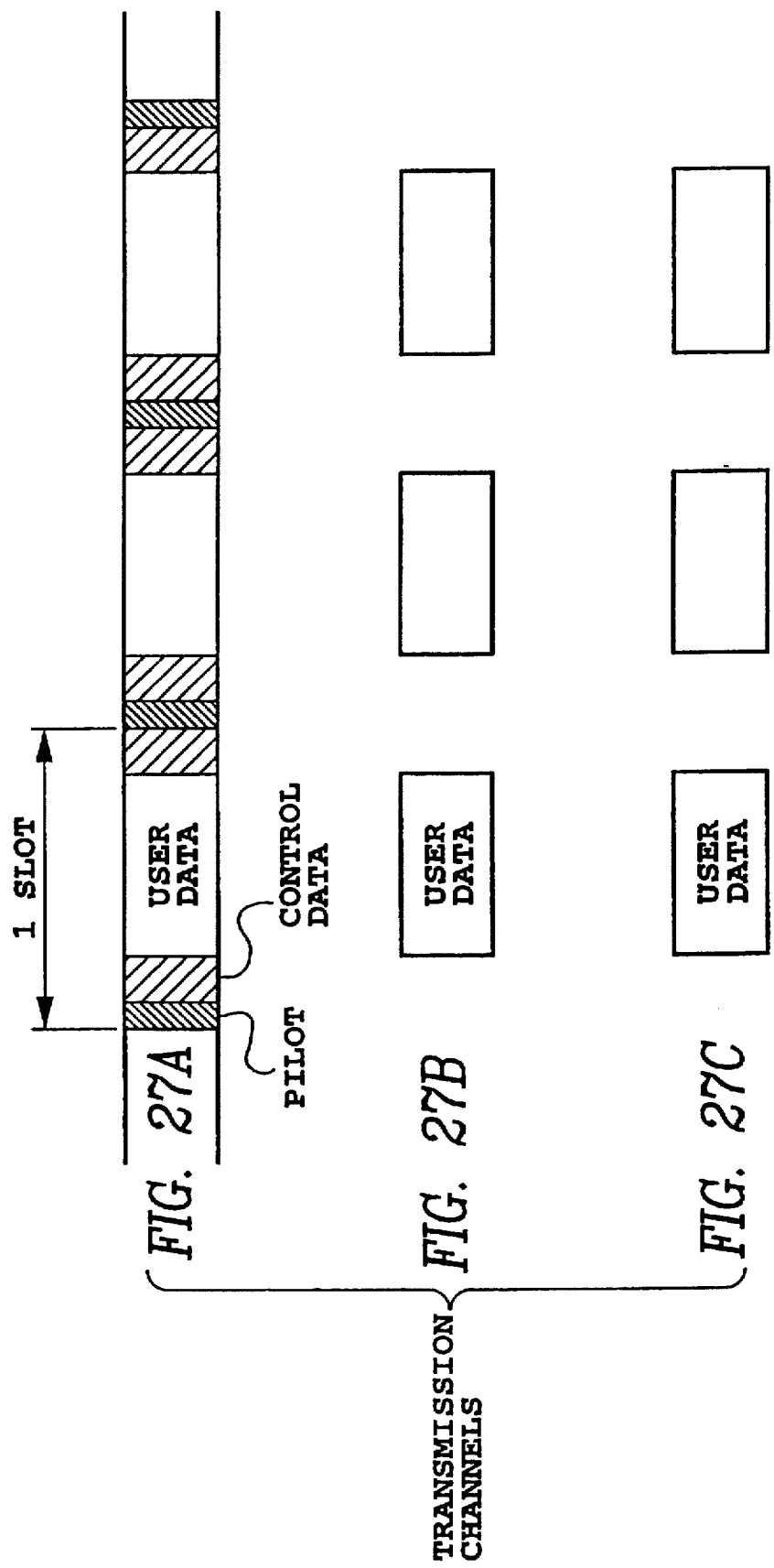
FIG. 27 is a schematic diagram illustrating the frame structure of a plurality of channels transmitted in the tenth embodiment.

FIG. 26 shows the tenth embodiment of the transmitter using the variable rate transmission method in accordance with the present invention, and FIG. 27 illustrates the frame arrangement to be transmitted.

FIGS. 26 and 27 show a case in which three frames are transmitted simultaneously (3 channels). A higher speed data transmission will demand more channels. The receiver is informed of the channel numbers used for the high speed transmission preceding the start of the transmission. The capacity of the frame memory of the interleaver 106 must be reserved at least twice that for storing the entire frames simultaneously transmitted. In addition, the frame memory must be accessible from a plurality of channels at the same time. Phase controllers 146b and 146c will be described in the next eleventh embodiment because this tenth embodiment describes the case in which the phase control is not performed.

In FIG. 26, the interleaver 106 successively writes the data to be transmitted into the frame memory at a high speed to form a plurality of transmitted frames. Since the control data is placed at the initial position of each frame, it is written in the side-a of the frame memory. When the side-a of the frame memory fills up, the data is written into the side-b of the frame memory. When the side-b of the frame memory fills up, the data is written into the side-c of the frame memory. The writing to the frame memory is performed at a speed higher than a normal transmission rate (three or more times the normal rate in this case).

Reading the plurality of frames simultaneously from this frame memory is carried out at the rate equal to the normal transmission rate. The writing to and reading from each of the sides of the frame memory is performed as in the sixth embodiment.

The data associated with the side-a to side-c undergo the primary modulation by primary modulators 108a–108c, are spread by secondary modulators 109a–109c using different spreading code sequences, and are summed up by an adder 148 to be transmitted.

The insertion of the pilot symbols is performed only in the channel-a, and the receiver compensates the other channels by using the pilot symbols of the channel-a. Thus, it is enough that only the channel-a inserts the pilot symbols. The power coefficient is controlled in the same manner as that of the seventh embodiment.

FIG. 27 illustrates the frame structure of each transmission channel when the high speed transmission is implemented by the simultaneous transmission using a plurality of channels. As shown in this figure, he control data and the pilot symbols are sent through one channel even if a plurality of transmission channels are used. The other channels do not transmit the portions corresponding to the pilot symbols and the control data. This makes it possible to reduce the interference power to other users.

To receive the data transmitted by the plurality of channels, the receiver must comprise the same number of receiving channels. The receiver, using the pilot symbols transmitted through one of the channels, compensates the received signals of the other channels. The control data of one of the channels is also used to control the other channels. The deinterleaver corresponding to the interleaver 106 performs writing and reading in the procedure opposite to that of the transmitter. The frame memory of the deinterleaver of the receiver must satisfy the condition that it can write a plurality of data at the same time, and read the plurality of data which have been written at a high speed (three times the normal speed in this case).

EMBODIMENT 11

As described in the tenth embodiment, the high speed data transmission is implemented by assigning the transmitted data to a plurality of transmission channels, by carrying out the primary modulation of them, and by spreading them into wideband signals by using multiple spreading codes to be sent. Using the binary PSK, for example, the phase after the primary modulation of each channel is either 0 (when the transmitted data is "1") or π radian (when the transmitted data is "0"). When they undergo the binary PSK using the spreading code sequences, the spread signals also take phases of 0 or π radian. Accordingly, if N spread signals are combined without shifting their phases, the amplitude increases by a factor of N, and hence a transmission power amplifier of high peak power is required.

Figure 28:
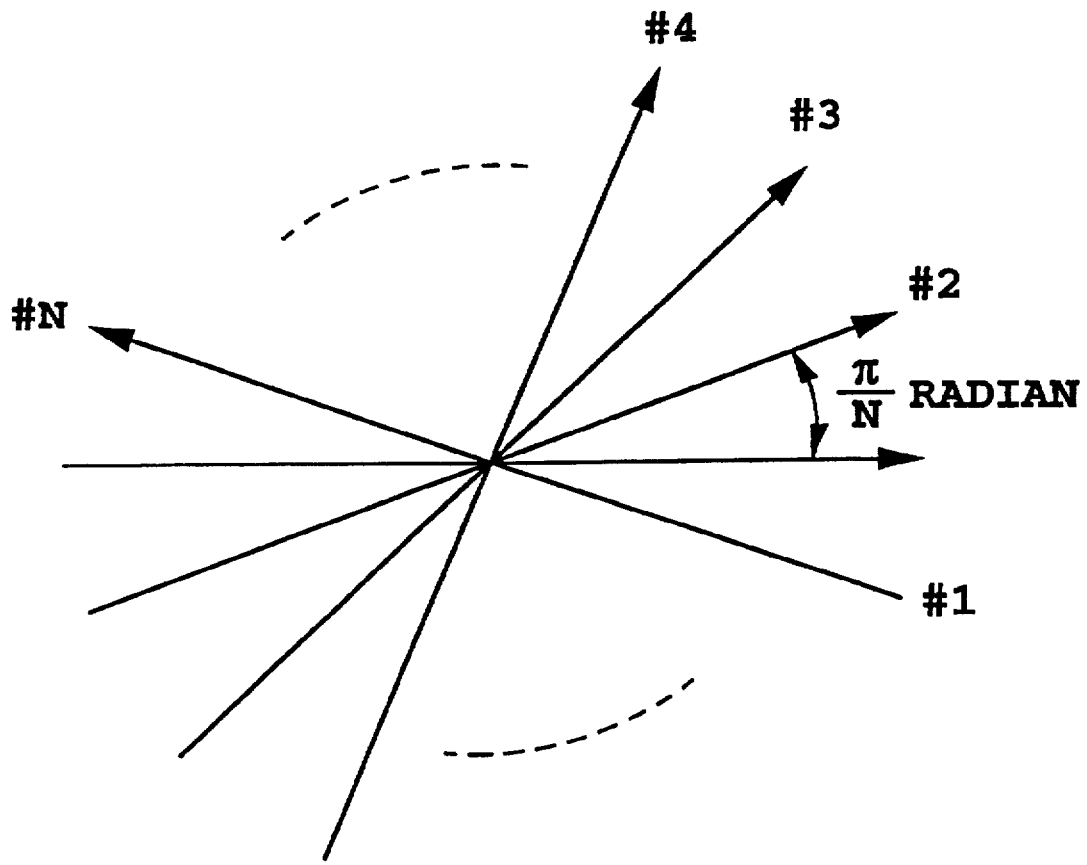
FIG. 28 is a diagram illustrating the phase control of a plurality of transmitted data in an eleventh embodiment of a transmitter using the variable rate transmission method in accordance with the present invention.

To avoid this, the phase control is carried out with the phase controllers 146b and 146c shown in FIG. 26. FIG. 28 illustrates the phase control when N signals are simultaneously sent. In this case, the phase of the primary or secondary modulated signal of the n-th channel is rotated by $n\pi/N$ radian. This will results in the combined amplitude of 1.4 times the amplitude of the uncombined signal when N=2, and 2.6 times when N=4. Thus, the peak of the transmission power can be limited as compared with the simple combining.

Since three channels are used in the embodiment shown in FIG. 26, the phase controller 146b rotates the phase by $\pi/3$, and the phase controller 146c rotates the phase by $2\pi/3$. Although the phase controllers 146b and 146c are inserted before the secondary modulators 109b and 109c in FIG. 26, this is not essential. The phase controllers 146b and 146c may be placed next to the secondary modulators 109b and 109c because it is enough that the phases are shifted of the carriers which have undergone the secondary modulation.

On the other hand, since the receiver knows the phase differences of the respective channels, it must correct the phase differences with phase controllers for respective channels. After correcting the phase differences of the channels, the receiver, using the pilot symbols sent through one channel, can compensate the data of the other channels as in the tenth embodiment.

What is claimed is:

1. A variable rate transmission method which varies an average transmission rate by transmitting each frame of a fixed duration, said frame holding data of a variable length, wherein a transmitting side comprises the steps of:

calculating in each frame an error detecting code of data to be transmitted;

transmitting said data to be transmitted and said error detecting code in said each frame at a predetermined fixed transmission rate; and pausing transmission in a blank of each frame, said blank being a part of said frame at which said data to be transmitted or said error detecting code is absent, wherein a receiving side comprises the steps of:

receiving said each frame at said fixed transmission rate;

detecting said error detecting code in said each frame; and recovering said transmitted data of the variable length in said each frame in response to a detecting result of said error detecting code, wherein said step of detecting said error detecting code sequentially divides received data in said each frame by predetermined data while shifting said received data bit by bit, and decides that said error detecting code is detected at a point at which said received data can be divided.

2. The variable rate transmission method as claimed in claim 1, wherein said step of recovering said transmitted data decides an end bit position of said transmitted data at a point preceding the point at which said error detecting code is detected by the number of bits of said error detecting code.

3. A variable rate transmission method which varies an average transmission rate by transmitting each frame of a fixed duration, said frame holding data of a variable length, wherein a transmitting side comprises the steps of:

calculating in each frame an error detecting code of data to be transmitted;

periodically inserting pilot symbols of a known pattern into said each frame;

disposing important data of said data to be transmitted near said pilot symbols;

transmitting said data to be transmitted and said error detecting code in said each frame at a predetermined fixed transmission rate; and pausing transmission in a blank of each frame, said blank being a part of said frame at which said data to be transmitted or said error detecting code is absent, and wherein a receiving side comprises the steps of:

receiving said each frame at said fixed transmission rate;

detecting said pilot symbols;

compensating said transmitted data and said error detecting code which are received using said pilot symbols which are detected;

relocating said transmitted data to its original order;

detecting said error detecting code in said each frame; and recovering said transmitted data of the variable length in said each frame in response to a detecting result of said error detecting code.

4. The variable rate transmission method as claimed in claim 3, wherein said step of disposing said important data near said pilot symbols comprises the steps of:

placing said important data at an initial position of said data to be transmitted;

writing said data to be transmitted row by row into a memory with N rows and M columns alternately from a top row and a bottom row of said memory, where N and M are positive integers;

reading from said memory, column by column, said data to be transmitted which has been stored in said memory; and inserting said pilot symbols each time said column is read.

5. The variable rate transmission method as claimed in claim 3, wherein said method is CDMA (Code Division Multiple Access), in which said transmitting side further comprises the steps of performing primary modulation of said data to be transmitted and said error detecting code, and performing secondary modulation of a signal which has undergone said primary modulation using a spreading code sequence.

6. The variable rate transmission method as claimed in claim 5, wherein transmission power is increased when transmitting said pilot symbols and said important data.

7. A variable rate transmission method which varies an average transmission rate by transmitting each frame of a fixed duration, said frame holding data of a variable length, wherein a transmitting side comprises the steps of:
calculating in each frame an error detecting code of data to be transmitted;
transmitting said data to be transmitted and said error detecting code in said each frame at a predetermined fixed transmission rate;
pausing transmission in a blank of each frame, said blank being a part of said frame at which said data to be transmitted or said error detecting code is absent;
when a total amount of said data to be transmitted and said error detecting code is equal to or less than $1/k$ of a maximum amount of data that can be transmitted by one frame, generating repeat frames, in each of which each bit of said data to be transmitted and said error detecting code is repeated K times;
transmitting said repeat frames at a transmission power of $1/k$ of transmission power used when said each bit is not repeated; and
informing said receiving side that said data to be transmitted and said error detecting code are repeated K times in said repeat frames, where K is a positive integer, wherein a receiving side comprises the steps of:
receiving said each frame at said fixed transmission rate;
detecting said error detecting code in said each frame;
recovering said transmitted data of the variable length in said each frame in response to a detecting result of said error detecting code; and
recovering original data from said repeat frames by thinning out data using said K informed from said transmitting side.

8. The variable rate transmission method as claimed in claim 7, wherein said transmitting side further comprises the steps of:
periodically inserting pilot symbols of a known pattern into said each frame; and
disposing important data of said data to be transmitted near said pilot symbols in said each frame, and wherein said receiving side further comprises the steps of:
detecting said pilot symbols;
compensating said transmitted data and said error detecting code which have been received using said pilot symbols detected; and
relocating said transmitted data received to its original order.

9. A variable rate transmission method which varies an average transmission rate by transmitting frames of a fixed duration, each frame holding data of a variable length, wherein a transmitting side comprises the steps of:
calculating in each frame an error detecting code of data to be transmitted;
allocating said frames to a plurality of channels; periodically inserting pilot symbols of a known pattern into each frame of one of said plurality of channels;
disposing important data of said data to be transmitted near said pilot symbols;
transmitting said data to be transmitted and said error detecting code in said each frame of said plurality of channels at a predetermined fixed transmission rate;
pausing transmission in a blank of each frame, said blank being a part of said frame at which said data to be transmitted or said error detecting code is absent;
spreading said data to be transmitted simultaneously using different spreading code sequences assigned to said plurality of channels to transmit spread data through each channel, and wherein a receiving side comprises the steps of:
simultaneously receiving said plurality of channels at said fixed transmission rate;
detecting pilot symbols of said one of said plurality of channels;
compensating received signals of said plurality of channels using pilot symbols detected;
relocating said transmitted data received to its original order;
detecting said error detecting code in said each frame; and
recovering said transmitted data of the variable length in said each frame in response to a detecting result of said error detecting code.

10. The variable rate transmission method as claimed in claim 9, wherein data of said plurality of channels are transmitted with a phase of a carrier of each of said plurality of channels being shifted.

11. The variable rate transmission method as claimed in any one of claims 3–6 and 8–10, wherein said important data is control data.

12. A variable rate transmission method which varies an average transmission rate by transmitting each frame of a fixed duration, said frame holding data of a variable length, wherein a transmitting side comprises the steps of:
calculating in each frame an error detecting code of data to be transmitted;
disposing said error detecting code at a fixed position in and relative to said each frame;
transmitting said data to be transmitted and said error detecting code in said each frame at a predetermined fixed transmission rate; and
pausing transmission in a blank of each frame, said blank being a part of said frame at which said data to be transmitted or said error detecting code is absent, and wherein a receiving side comprises the steps of:
receiving said each frame at said fixed transmission rate;
extracting said error detecting code placed at said fixed position in said each frame;

detecting an error detecting code in said each frame;
obtaining the number of bits of said transmitted data on the basis of said error detecting code; and
recovering said transmitted data of the variable length in said each frame in response to the obtained number of bits of said transmitted data.

13. The variable rate transmission method as claimed in claim 12, wherein:
said method is a CDMA data transmission method in which said transmitting side further comprises the steps of performing primary modulation of said data to be transmitted and said error detecting code in said each frame, and performing secondary modulation of primary modulated data in each frame by using a spreading code sequence.

14. The variable rate transmission method as claimed in claim 13, wherein:
said transmitting side further comprises the step of performing error correcting encoding and interleaving of said data to be transmitted before said primary modulation, and
said receiving side further comprises the steps of performing a primary demodulation of said transmitted data which is received, and performing deinterleaving and error correcting decoding of said transmitted data which have undergone said primary demodulation.

15. The variable rate transmission method as claimed in claim 12,
wherein said transmitting side further comprises the steps of:
repeating each bit of said data to be transmitted and said error detecting code K times, where K is a positive integer, when a total amount of said data to be transmitted and said error detecting code in said each frame is equal to or less than 1/k of a maximum amount of data that can be transmitted by said each frame;
reducing transmission power of each frame having bits repeated K times to 1/k of a transmission power used when a bit is not repeated; and
wherein said receiving side further comprises the steps of:
integrating over K bit interval said transmitted data and said error detecting code which have been received which includes bits repeated K times; and
recovering said transmitted data by performing thinning out processing of integrated data for every K bits.

16. A variable rate transmission method which varies an average transmission rate by transmitting each frame of a fixed duration, said frame holding data of a variable length,
wherein a transmitting side comprises the steps of:
calculating in each frame an error detecting code of data to be transmitted;
adding to a fixed position in said each frame, transmission rate information representative of the number of bits of data in said each frame and said error detecting code;
transmitting said data to be transmitted, said transmission rate information and said error detecting code in said each frame at a predetermined fixed transmission rate; and
pausing transmission in a blank of each frame, said blank being a part of said frame at which said data to be transmitted or said error detecting code is absent, and
wherein a receiving side comprises the steps of:
receiving said each frame at said fixed transmission rate;
obtaining an end bit position of said transmitted data in each said frame in response to said transmission rate information;
calculating error detecting code of said transmitted data to said end position;
comparing said calculated error detecting code with said error detecting code which has been received;
deciding that said transmitted data to said end bit position is correct when a compared result of the step of comparing coincides; and
recovering said transmitted data of the variable length in said each frame.

17. The variable rate transmission method as claimed in claim 16, wherein:
said transmission method is a CDMA data transmission method in which said transmitting side further comprises the steps of performing primary modulation of said data to be transmitted, said transmission rate information and said error detecting code in said each frame, and performing secondary modulation of primary modulated data in each frame by using a spreading code sequence.

18. The variable rate transmission method as claimed in claim 17,
wherein said transmitting side further comprises the steps of:
performing error correcting encoding of said data to be transmitted, said transmission rate information and said error detecting code in said each frame before said primary modulation;
interleaving error correcting encoded data in said each frame; and
performing said primary modulation of interleaved data, and
wherein said receiving side further comprises the steps of:
despreading data in said each frame which is received by using a spreading code sequence;
performing a primary demodulation of a despread signal; and
deinterleaving transmission data which has undergone said primary demodulation.

19. The variable rate transmission method as claimed in claim 16,
wherein said transmitting side further comprises the step of:
placing said transmission rate information associated with a current frame at a fixed position in a preceding frame, and
wherein said receiving side further comprises the steps of:
extracting said transmission rate information received in said preceding frame; and
deciding an end bit position of data in said current frame in response to said transmission rate information which has been extracted.

20. The variable rate transmission method as claimed in claim 19,
wherein said transmitting side further comprises the steps of:
performing error correcting encoding of data in said each frame;
interleaving said each frame;
performing primary modulation of said each frame which has been interleaved; and
performing secondary modulation of primary modulated transmission data in said each frame by using a spreading code sequence, and wherein said receiving side further comprises the steps of:
  performing a primary demodulation of said transmission data which has been received;
  deinterleaving said transmission data which has undergone said primary demodulation.

21. The variable rate transmission method as claimed in any one of claims 16–20,
  wherein said transmission side further comprises:
    when the number of bits of said transmitted data in said each frame is equal to or less than 1/k of the maximum number of bits of data that can be transmitted by said each frame, where K is a positive integer, repeating each bit of said data to be transmitted K times; and
    reducing transmission power of said each frame which has bits repeated K times to 1/k of a transmission power used when a bit is not repeated, and
  wherein said receiving side further comprises:
    integrating over a K bit interval said transmitted data which has been received which includes bits repeated K times; and
    recovering said transmitted data by performing thinning out processing of integrated data for every K bits.

22. A transmitter which varies an average transmission rate by transmitting each frame of a fixed duration, said frame holding data of a variable length, said transmitter comprising:
  a memory for storing said data to be transmitted;
  pilot symbol inserting means for periodically inserting pilot symbols of a known pattern into said each frame;
  data relocating means for disposing near said pilot symbols important data of said data to be transmitted stored in said memory;
  means for calculating in said each frame an error detecting code of data to be transmitted; and
  means for transmitting said data to be transmitted and said error detecting code in said each frame at a predetermined fixed transmission rate, and for pausing transmission in a blank of each frame, said blank being a part of said frame at which said data to be transmitted or said error detecting code is absent.

23. The transmitter as claimed in claim 22, wherein:
  said data relocating means disposes said important data near said pilot symbols by writing said data to be transmitted into said memory row by row with a length of M bits and by reading said stored data to be transmitted from said memory column by column with a length of N bits, wherein N is the number of bits of a slot sandwiched by said pilot symbols, and M is the number of said slots contained in said each frame.

24. The transmitter as claimed in claim 23, wherein:
  said data relocating means writes said important data into said memory alternately from a top row and a bottom row of said memory.

25. The transmitter as claimed in any one of claims 22–24, further comprising:
  a primary modulator for modulating data in said each frame including said data to be transmitted;
  a secondary modulator for performing secondary modulation that spreads data of said each frame which has undergone said primary modulation using a spreading code sequence; and
  wherein said pilot symbol inserting means is connected between said primary modulator and said secondary modulator, and periodically inserts said pilot symbols between slots.

26. The transmitter as claimed in claim 24, further comprising:
  a transmission power control means connected to said pilot symbol inserting means for controlling transmission power of data in said each frame in accordance with a degree of importance of said data.

27. The transmitter as claimed in claim 26, wherein:
  a predetermined particular code is written in a blank in said each frame, said blank occurring when the number of bits of said transmitted data is less than the maximum number of bits of said each frame, and
  said transmission power control means reduces transmission power of said blank to zero in accordance with said code.

28. The transmitter as claimed in claim 27, further comprising:
  a repeater preceding said memory for repeating said transmitted data and said error detecting code K times for each bit,
  wherein said transmission power control means reduces transmission power of said each frame having bits repeated K times to 1/k as compared with transmission power used when said repeating K times is not performed.

29. A transmitter which varies an average transmission rate by transmitting each frame of a fixed duration, said frame holding data of a variable length, said transmitter comprising:
  means for calculating in said each frame an error detecting code of data to be transmitted;
  pilot symbol inserting means for periodically inserting pilot symbols of a known pattern into said each frame;
  a memory for storing said data to be transmitted, said memory capable of reading multiple sets of transmitted data to be transmitted in association with a plurality of channels;
  means for pausing transmission in a blank of each frame, said blank being a part of said frame at which said transmitted data or said error detecting code is absent;
  data relocating means for writing data into said memory such that important data of said transmitted data to be transmitted stored in said memory is placed near said pilot symbols;
  a plurality of primary modulators for primary modulating said multiple sets of transmitted data at a predetermined fixed transmission rate;
  a plurality of transmission power control means for controlling transmission power of said each frame output from said primary modulators;
  a plurality of secondary modulators for spreading data in said each frame output from said transmission power control means by using different spreading code sequences; and
  an adder for adding multiple signals output from said secondary modulators, wherein said data relocating means divides said data to be written into said memory, simultaneously reads from said memory said multiple sets of data which have been formed by the dividing, and supplies read data to said plurality of primary modulators, said pilot symbol inserting means is connected after one of said plurality of primary modulators for periodically inserting said pilot symbols, and said plurality of transmission power control means increase transmission power while transmitting said important data.

30. The transmitter as claimed in claim 29, further comprising:

a plurality of phase controllers each connected after said plurality of primary modulators for shifting phases of carriers of said secondary modulators.

31. A transmitter which varies an average transmission rate by transmitting each frame of a fixed duration, said frame holding data of a variable length, said transmitter comprising:

means for calculating in said each frame an error detecting code of data to be transmitted;

means for adding said error detecting code to a fixed position in and relative to said each frame; and means for transmitting said data to be transmitted and said error detecting code in said each frame at a predetermined fixed transmission rate, and for pausing transmission in a blank of each frame, said blank being a part of said frame at which said data to be transmitted or said error detecting code is absent.

32. The transmitter as claimed in claim 31, further comprising:

means for performing error correcting encoding of data in said each frame;

means for interleaving data which has undergone said error correcting encoding;

means for primary modulating interleaved data; and means for secondary modulating primary modulated data by using a spreading code.

33. The transmitter as claimed in claim 31 or 32, further comprising:

means for repeating K times each bit of data in said each frame when the number of bits of said data in said each frame is equal to or less than $1/K$ of the maximum number of bits that can be transmitted in one frame, where K is a positive integer; and transmission power control means for reducing transmission power of said each frame having bits repeated K times to $1/K$ in comparison with transmission power used when said repeating K times is not performed.

34. A transmitter which varies an average transmission rate by transmitting each frame of a fixed duration, said frame holding data of a variable length, said transmitter comprising:

means for calculating in said each frame an error detecting code of data to be transmitted;

adding means for adding, to a fixed position in and relative to said each frame, transmission rate information representative of the total number of data in said each frame and said error detecting code; and means for transmitting said data to be transmitted, transmission rate information and said error detecting code in said each frame at a predetermined fixed transmission rate, and for pausing transmission in a blank of each frame, said blank being a part of said frame at which said data to be transmitted or said error detecting code is absent.

35. The transmitter as claimed in claim 34, further comprising:

means for performing error correcting encoding of said data to be transmitted, said transmission rate information, and said error detecting code in said each frame;

means for interleaving data which has undergone said error correcting encoding;

means for primary modulating interleaved data; and means for secondary modulating primary modulated data by using a spreading code.

36. The transmitter as claimed in claim 34, further comprising:

means for adding said transmission rate information associated with a current frame to a fixed position in a preceding frame.

37. The transmitter as claimed in claim 36, further comprising:

means for performing error correcting encoding of said data to be transmitted, said transmission rate information, and said error detecting code in said each frame;

means for interleaving data which has undergone said error correcting encoding;

means for primary modulating interleaved data; and means for secondary modulating primary modulated data by using a spreading code.

38. The transmitter as claimed in any one of claims 34-37, further comprising:

means for repeating K times each bit of data in said each frame when the number of bits of said data in said each frame is equal to or less than $1/K$ of the maximum number of bits that can be transmitted in one frame, where K is a positive integer; and transmission power control means for reducing transmission power of said each frame having bits repeated K times to $1/K$ in comparison with transmission power used when said repeating K times is not performed.

39. A receiver, comprising:

means for receiving, at a fixed transmission rate, frames which each include transmitted data;

detecting means for detecting error detecting code in said each frame; and means for recovering said transmitted data of a variable length in said each frame in response to a detection result of said error detecting code, wherein said detecting means sequentially divides received data in each said frame by predetermined data while shifting said received data bit by bit, and decides that said error detecting code is detected at a point at which said received data can be divided.

40. A receiver, comprising:

means for receiving, at a fixed transmission rate, frames which each include transmitted data;

means for detecting error detecting code in said each frame;

means for recovering said transmitted data of a variable length in said each frame in response to a detection result of said error detecting code;

means for detecting pilot symbols of a known pattern, which are inserted into said each frame periodically;

a memory for storing data transmitted in said each frame; and data relocating means for rearranging data written in said memory to an original order when receiving transmitted data in said each frame which has important data disposed near said pilot symbols.

41. The receiver as claimed in claim 40, wherein:

said data relocating means rearranges said data in said each frame into the original order by writing said data in said each frame into said memory column by column with a length of N bits, and by reading said stored data of said each frame from said memory row by row with a length of M bits, wherein N is the number of bits of a slot sandwiched by said pilot symbols, and M is the number of said slots contained in said each frame.

42. The receiver as claimed in claim 41, wherein:

said data relocating means carries out reading of said memory alternately from a top row and a bottom row of said memory.

43. The receiver as claimed in any one of claims 40–42, further comprising:

a secondary demodulator for despreading received data by using a spreading code sequence;

a compensator for compensating said data in said each frame by using said pilot symbols; and a primary demodulator for demodulating said data which has been compensated by said compensator.

44. The receiver as claimed in claim 43, further comprising:

means for integrating over K bit interval said data in said each frame which has been received and which has bits repeated K times; and means for recovering said transmitted data by performing thinning out of the integrated data at every K bits.

45. A receiver comprising:

a plurality of secondary demodulators for despreading each of a multiple series of frames simultaneously transmitted through a plurality of channels;

a compensator for compensating data in said multiple series of frames by using pilot symbols which are periodically inserted into one of said multiple series of frames and which are sent through one of said plurality of channels;

a plurality of primary demodulators for demodulating compensated data;

a memory for storing said multiple series of data at the same time;

data relocating means for rearranging important data disposed near said pilot symbols to its original order by simultaneously writing said multiple series of frames in separated areas of said memory, and by reading written data in an order different from that of writing;

means for detecting error detecting code in said each frame; and means for recovering said transmitted data of a variable length in said each frame in response to a detection result of said error detecting code.

46. The receiver as claimed in claim 45, further comprising:

phase controllers each provided for each one of said channels for correcting phases of said multiple series of data.

47. A receiver comprising:

a secondary demodulator for despreading a received spread signal, and for outputting a despread signal;

a primary demodulator for recovering data in each frame from said despread signal;

an error detecting code memory for storing said error detecting code placed at a fixed position in said each frame;

means for calculating an error detecting code from said data in said each frame; and comparing means for comparing said calculated error detecting code with said error detecting code stored in said error detecting code memory, wherein the number of bits of variable bit data in said each frame is obtained in response to a result of the comparison.

48. The receiver as claimed in claim 47, further comprising:

means for deinterleaving data output from said primary demodulator; and means for performing error correcting decoding of the data which has been deinterleaved.

49. The receiver as claimed in claim 47 or claim 48, further comprising:

means for integrating over a K bit interval said data in said each frame which has been received; and means for recovering said transmitted data by performing thinning out of the integrated data at every K bits.

50. A receiver, comprising:

means for receiving, at a fixed transmission rate, frames which include transmitted data, transmission rate information and an error correcting code;

means for obtaining an end bit position of said transmitted data in each said frame which has been received in response to said transmission rate information which is placed at a fixed position of said each frame, said end bit position determining the number of bits of said transmitted data in said each frame;

means for calculating error detecting code of said transmitted data to said end position;

means for comparing the calculated error detecting code with said error detecting code which has been transmitted in said each frame; and means for deciding that said transmitted data to said end bit position is correct in said each frame when a compared result coincides.

51. The receiver as claimed in claim 50, further comprising:

a secondary demodulator for despreading a received spread signal and for outputting a despread signal;

a primary demodulator for recovering data in each frame from said despread signal;

means for deinterleaving data output from said primary demodulator;

first means for performing error correcting decoding of said transmission rate information and said error detecting code among data output from said means for deinterleaving; and second means for performing error correcting decoding of said transmitted data to its end bit position in response to a result of said first means.

52. The receiver as claimed in claim 50, wherein:

said means for deciding determines the end bit position of said transmitted data in a current frame in accordance with said transmission rate information received in a preceding frame.

53. The receiver as claimed in claim 52, further comprising:

a secondary demodulator for despreading a received spread signal and for outputting a despread signal;

a primary demodulator for recovering data in each frame from said despread signal;

means for deinterleaving data output from said primary demodulator;

means for performing error correcting decoding of said transmission rate information and said error detecting code among data output from said means for deinterleaving; and means for performing error correcting decoding of said transmitted data to its end bit position in response to a result of said error correcting decoding of said transmission rate information received in a preceding frame.

54. The receiver as claimed in any one of claims 50–53, further comprising:

means for integrating over a K bit interval said data in said each frame which has been received when the number of bits of data in said each frame is equal to or less than 1/k of a maximum number of bits that can be transmitted by one frame, where K is a positive integer; and means for recovering said transmitted data by performing thinning out of the integrated data at every K bits.

55. A variable rate transmission method, comprising the steps of:

inserting pilot symbols of a known pattern into each frame periodically and disposing important data of data to be transmitted near said pilot symbols;

detecting said pilot symbols;

compensating by the detected pilot symbols said data to be transmitted and error detecting code which have been received; and rearranging said data to be transmitted which has been received to its original order, wherein said step of disposing said important data near said pilot symbols comprises the steps of:

placing said important data at an initial position of said data to be transmitted;

writing said data to be transmitted row by row into a memory with N rows and M columns alternately from a top row and a bottom row of said memory;

reading from said memory, column by column, said data which has been stored in said memory; and inserting said pilot symbols each time said column is read.

56. The variable rate transmission method as claimed in claim 55, wherein:

said method is a CDMA data transmission method further comprising the steps of performing primary modulation of said data to be transmitted and said error detecting code in said each frame, and performing secondary modulation of primary modulated data in each frame by using a spreading code sequence.

57. The variable rate transmission method as claimed in claim 56, wherein transmission power is increased when transmitting said pilot symbols and said important data.

* * * * *